US010695822B2

(12) United States Patent
Blacket et al.

(10) Patent No.: US 10,695,822 B2
(45) Date of Patent: Jun. 30, 2020

(54) BLIND RIVETING APPARATUS AND METHODS

(71) Applicant: Henrob Limited, Flintshire (GB)

(72) Inventors: Stuart Edmund Blacket, Queensland (AU); Wojciech Gostylla, Queensland (AU)

(73) Assignee: Atlas Copco IAS UK Limited, Flintshire (GB)

( * ) Notice: Subject to any disclaimer, the term of this patent is extended or adjusted under 35 U.S.C. 154(b) by 311 days.

(21) Appl. No.: 14/414,241

(22) PCT Filed: Jul. 12, 2013

(86) PCT No.: PCT/GB2013/051875
§ 371 (c)(1),
(2) Date: Jan. 12, 2015

(87) PCT Pub. No.: WO2014/009753
PCT Pub. Date: Jan. 16, 2014

(65) Prior Publication Data
US 2015/0143686 A1 May 28, 2015

(30) Foreign Application Priority Data

Jul. 13, 2012 (GB) .................................. 1212538.1
Aug. 29, 2012 (GB) .................................. 1215341.7

(51) Int. Cl.
*B21J 15/26* (2006.01)
*B21J 15/02* (2006.01)
(Continued)

(52) U.S. Cl.
CPC ............. *B21J 15/26* (2013.01); *B21J 15/027* (2013.01); *B21J 15/043* (2013.01); *B21J 15/28* (2013.01);
(Continued)

(58) Field of Classification Search
CPC . B21J 15/027; B21J 15/26; B21J 15/28; B21J 15/043; B29C 65/06; B29C 65/7437;
(Continued)

(56) References Cited

U.S. PATENT DOCUMENTS 2,473,913 A * 6/1949 Shaff ...................... B21J 15/043
72/114
4,063,443 A * 12/1977 Yarbrough ............. B21J 15/043
29/243.526
(Continued)

FOREIGN PATENT DOCUMENTS

CN 1125474 6/1996
CN 1132541 10/1996
(Continued)

OTHER PUBLICATIONS

JP 2001 321878 A; Hayashi; Nov. 2001 Machine Translation.*
(Continued)

*Primary Examiner* — Lee A Holly
(74) *Attorney, Agent, or Firm* — Michael Best & Friedrich LLP

(57) ABSTRACT

A blind riveting apparatus (1) comprises a motor (3), and a clamp (31) for gripping the mandrel of a blind rivet, the clamp being movable substantially along the axis of the rivet. The apparatus further comprises a first transmission (51) configured to transfer rotary motion of the motor (3) to the clamp (31) when engaged; and a second transmission (52) configured to convert rotary motion of the motor (3) to linear motion of the clamp (31), and thereby retract the clamp (31) to pull on the mandrel, when engaged. A transmission control apparatus is arranged to selectively adjust the degree of engagement of at least one of the first (51) and second (52) transmissions, the transmission control apparatus comprising a variable-influence brake or clutch (58).

(Continued)

Methods of blind riveting, and further pieces of blind riveting apparatus, are also disclosed.

17 Claims, 17 Drawing Sheets

(51) Int. Cl.
| | | |
|---|---|---|
| F16D 37/00 | (2006.01) | |
| F16D 57/00 | (2006.01) | |
| B29C 65/56 | (2006.01) | |
| B29C 65/74 | (2006.01) | |
| B29C 65/00 | (2006.01) | |
| B21J 15/04 | (2006.01) | |
| B23K 20/12 | (2006.01) | |
| B21J 15/28 | (2006.01) | |
| B29C 65/06 | (2006.01) | |
| F16H 25/20 | (2006.01) | |
| F16H 25/22 | (2006.01) | |
| B29L 9/00 | (2006.01) | |

(52) U.S. Cl.
CPC .......... *B23K 20/123* (2013.01); *B23K 20/125* (2013.01); *B29C 65/06* (2013.01); *F16D 37/008* (2013.01); *F16D 57/002* (2013.01); *F16H 25/2025* (2013.01); *F16H 25/2266* (2013.01); *B29L 2009/00* (2013.01); *Y10T 29/49835* (2015.01); *Y10T 29/49956* (2015.01); *Y10T 29/5377* (2015.01); *Y10T 29/53752* (2015.01); *Y10T 74/18568* (2015.01); *Y10T 74/18664* (2015.01)

(58) Field of Classification Search
CPC . B29C 65/562; B29C 65/069; B29C 65/0672; B29C 66/8322; B29C 66/1122; B29C 66/21; B29C 66/41; B29C 66/7212; F16D 37/008; F16D 57/002; F16D 51/08; F16D 27/112; F16H 25/2025; F16H 25/2266; B23K 20/123; B23K 20/125; Y10T 29/49385; Y10T 29/49956; Y10T 29/5377; Y10T 29/53752; Y10T 74/18664; Y10T 74/18568
See application file for complete search history.

(56) References Cited

U.S. PATENT DOCUMENTS

| | | | |
|---|---|---|---|
| 4,910,992 A | 3/1990 | Stenberg et al. | |
| 5,256,017 A | 10/1993 | Smirnov et al. | |
| 5,511,298 A | 4/1996 | Gasser | |
| 6,373,207 B1 * | 4/2002 | Yablonovitch | H02P 3/12 318/362 |
| 7,024,270 B2 | 4/2006 | Mauer et al. | |
| 7,695,227 B2 | 4/2010 | Stevenson et al. | |
| 7,832,074 B2 | 11/2010 | Stevenson et al. | |
| 7,862,271 B2 | 1/2011 | Wang et al. | |
| 8,443,512 B2 * | 5/2013 | Masugata | B21J 15/043 29/243.521 |
| 2002/0125297 A1 | 9/2002 | Stol et al. | |
| 2002/0166221 A1 * | 11/2002 | Clew | B21J 15/025 29/407.02 |
| 2005/0178816 A1 | 8/2005 | Stevenson et al. | |
| 2008/0093420 A1 | 4/2008 | Mauer | |
| 2009/0061187 A1 | 3/2009 | Wang et al. | |
| 2009/0070976 A1 | 3/2009 | Amirault | |
| 2010/0084456 A1 | 4/2010 | Carter | |
| 2010/0186900 A1 | 7/2010 | Christ | |
| 2010/0232907 A1 | 9/2010 | Jokisch | |
| 2010/0275424 A1 * | 11/2010 | Masugata | B21J 15/043 29/243.521 |
| 2011/0164945 A1 | 7/2011 | Lathabai et al. | |
| 2015/0143686 A1 | 5/2015 | Blacket et al. | |

FOREIGN PATENT DOCUMENTS

| | | |
|---|---|---|
| CN | 101468421 | 7/2009 |
| CN | 101722360 | 6/2010 |
| CN | 101877515 | 11/2010 |
| CN | 102233402 | 11/2011 |
| CN | 102319952 | 1/2012 |
| DE | 2417646 | 10/1947 |
| EP | 0953390 A2 | 11/1999 |
| EP | 1712311 | 10/2006 |
| EP | 2072174 | 6/2009 |
| JP | 3189042 | 8/1991 |
| JP | H0471728 | 3/1992 |
| JP | H11-320016 | 11/1999 |
| JP | 20000002274 | 1/2000 |
| JP | 2001321878 | 11/2001 |
| JP | 2001321878 A * | 11/2001 |
| JP | 2001349394 | 12/2001 |
| JP | 2002239755 | 8/2002 |
| JP | 2004017084 | 1/2004 |
| JP | 2005153008 | 6/2005 |
| JP | 2005288525 | 10/2005 |
| JP | 2006289502 | 10/2006 |
| JP | 2008155806 | 7/2008 |
| KR | 1020110112209 | 10/2011 |
| WO | 1994029602 | 12/1994 |
| WO | 2008072380 A1 | 6/2008 |
| WO | 2011060499 A1 | 5/2011 |

OTHER PUBLICATIONS

First Office Action from the State Intellectual Property Office of China for Application No. 201380037503X dated Oct. 27, 2015 (8 pages).
Office Action from the Korean Intellectual Property Office for Application No. 1020157003810 dated Jan. 7, 2016 (14 pages).
International Search Report for International Application No. PCT/GB2013/051875 dated Oct. 28, 2013 (4 pages).
Third Office Action from the State Intellectual Property Office of China for Application No. 2013800374465 dated Jan. 3, 2017 (7 pages).
Office Action from the Patent Office of Japan for Application No. 2015-521070 dated Apr. 20, 2107 (15 pages).
Office Action from the State Intellectual Property Office of China for Application No. 201380037446.5 dated Nov. 20, 2015 (6 pages).
Office Action from the Japanese Patent Office for Application No. 2015-521069 dated May 17, 2017 (17 pages).
English Translation of Japanese Patent Office Action for Application 2017-150338 dated Jul. 31, 2018 (5 pages).
International Search Report for related Application No. PCT/GB2013/051876 dated Feb. 5, 2014 (6 pages).

* cited by examiner

BLIND RIVETING APPARATUS AND METHODS

CROSS-REFERENCE TO RELATED APPLICATIONS

This patent application is a national stage filing under 35 U.S.C. 371 of International Patent Application No. PCT/GB2013/051875, filed Jul. 12, 2013 which claims priority to United Kingdom Patent Application No. 1212538.1, filed Jul. 13, 2012 and United Kingdom Patent Application No. 1215341.7, filed Aug. 29, 2012, the entire contents of which are hereby incorporated by reference herein.

FIELD OF THE INVENTION

The present invention relates to blind riveting apparatus and methods.

BACKGROUND

Friction stir spot welding is a method of spot-joining two or more metal layers of a workpiece together. A cylindrical punch with a shouldered probe at its tip is rotated and driven into the workpiece layers to be joined. Friction between the probe and the workpiece layers causes the layers to soften and plasticise without melting, and the rotation of the probe displaces the material and causes the plasticised portions of the two layers to intermingle. When the punch is withdrawn and the workpiece allowed to cool, the intermingled plasticised portions harden and produce a welded joint between the two layers.

Recently, the softening of material through a friction stir mechanism has been used in relation to blind riveting. Rather than pre-drilling a hole for the rivet, the rivet is rotated and driven into the workpiece so as to cause friction stir softening of the material. The rivet is then driven through the workpiece and once the material has cooled, the rivet is upset in the usual manner.

Present friction stir spot-joining machines and methods which utilise friction stir softening, such as those above, use an actuator (a motor) to produce the required rotation of the blind rivet or welding punch. A second actuator is used to produce the motion required to either drive the tip of the punch into the workpiece, or to pull on the mandrel of a blind rivet to upset it, depending on the process in question. Use of two actuators not only increases the cost of the apparatus, but also significantly increases its bulk and weight. The added weight may limit the choice of robotic arms on which the apparatus can be mounted due to some arms not being able to sustain the force necessary to lift the apparatus, and the added bulk may prevent the apparatus from reaching into small spaces. Use of two actuators may also adversely affect the service life and/or maintenance cost of the apparatus.

It is an object of the present invention to obviate or mitigate at least one of the aforesaid disadvantages, and/or to provide an improved or alternative friction stir blind riveting apparatus or an improved or alternative method of performing friction stir blind riveting.

SUMMARY

Throughout this specification, the term "comprising" or "comprises" means including the component(s) specified but not to the exclusion of the presence of others.

Optional and/or preferred features as set out herein may be used either individually or in combination with each other where appropriate and particularly in the combinations as set out in the accompanying claims. The optional and/or preferred features for each aspect of the invention set out herein are also applicable to any other aspects of the invention, where appropriate.

According to a first aspect of the invention there is provided a blind riveting apparatus comprising: a motor; a clamp for gripping the mandrel of a blind rivet, the clamp being movable substantially along the axis of the mandrel; a first transmission configured, when engaged, to transfer rotary motion of the motor to the clamp; a second transmission configured, when engaged, to convert rotary motion of the motor to linear motion of the clamp, and thereby retract the clamp to pull on the mandrel; and a transmission control apparatus arranged to selectively adjust the degree of engagement of at least one of the first and second transmissions, the transmission control apparatus comprising a variable-influence brake or clutch.

The apparatus having a single motor which can produce both rotary motion of the rivet and linear motion of the clamp has a number of advantages. Incorporating a single motor may not only make the apparatus cheaper than an equivalent apparatus with two motors, but may also make it lighter and less bulky. The decreased weight may allow lighter built and less powerful robotic arms or other types of automation to be used, which may themselves be cheaper, lighter and/or less bulky. An apparatus of less bulk may also be beneficial in allowing it to reach into smaller spaces. Additionally, the apparatus comprising a single motor may increase or simplify the service life and/or decrease the maintenance cost of the apparatus. Furthermore, utilisation of a single motor may advantageously simplify control of the apparatus. For instance, where the apparatus is computer controlled, the control algorithm may be of reduced complexity compared to one which must control multiple motors individually, especially where the actions of these motors must be co-ordinated (for instance in respect of their speeding up or slowing down, or where the action of one motor alters the loading placed on the other).

For the avoidance of doubt, the axis of the mandrel of a blind rivet is its longitudinal axis, i.e. its longitudinal centreline.

The term 'variable-influence' clutch or brake system should be interpreted as a clutch or brake system in which the amount of slip the brake or clutch permits can be varied according to how firmly it is applied. In other words, the braking or coupling force it provides can be controlled to a greater extent than simply on/off. However, a variable-influence clutch or brake system may be controlled by the transmission control apparatus such that it is only capable of permitting two different levels of slip (such as it either permitting no slip or providing no restriction to slip). Further, the variable-influence clutch or brake may be pre-set by the transmission control apparatus to a single value throughout the duration of a blind-riveting operation (for instance as outlined below).

The transmission control apparatus may be arranged to selectively adjust the degree of engagement of both the first and second transmissions, and/or may be arranged to selectively adjust the degree of engagement of said transmission or transmissions to any degree of engagement within the operable range of the transmission, and/or may be arranged to selectively adjust the degree of engagement of said transmission or transmissions between fully disengaged and fully engaged states.

In one embodiment the second transmission comprises a first threaded member connected to the motor and a second threaded member connected to the clamp, the threads of the first and second threaded members being arranged to directly or indirectly act on each other to convert rotation of the first threaded member relative to the second threaded member into linear motion of the second threaded member.

In the above embodiment, the transmission control apparatus may be configured to engage the first transmission by rotationally coupling the first and second threaded members so as to restrict relative rotation therebetween, and be configured to engage the second transmission by restricting rotation of the second threaded member so that relative rotation of the first and second threaded members takes place.

Rotational coupling of members is used herein to refer to the rotation of one member causing rotation of the other member. Two rotationally coupled members may or may not rotate in the same direction and/or at the same angular speed.

The transmission control apparatus may comprise a one-directional clutch, and/or a variable-influence brake system.

The variable-influence brake system may comprise a volume of magneto-rheological or electro-rheological fluid retained in a cavity between a rotationally fixed component and a rotational component, the variable-influence brake system further comprising an electric or magnetic field generator arranged to selectively apply an electric or magnetic field to the volume of fluid in order to alter the viscosity of the fluid. Alternatively or in addition, the transmission control apparatus may be configured to selectively adjust the degree of engagement of the second transmission by controlling the amount of slip permitted by the variable-influence brake system.

The apparatus may further comprise a nose piece which is configured to engage with the blind rivet, the clamp being arranged to rotate the rivet by rotationally driving the nose piece.

The apparatus may further comprise a controller configured to monitor the performance of the apparatus via one or more sensors.

The apparatus may further comprise a controller configured to gather feedback on the status or dynamic performance of the apparatus via one or more sensors, and calculate and/or implement real-time adjustments to said status or dynamic performance of the apparatus.

The apparatus may be configured to be capable of accommodating the force/motion timings that may be required for any reasonable process profile.

The first transmission of the apparatus may comprise substantially all the components of the second transmission. This may be interpreted to mean that the first transmission may comprise all of the components of the second transmission, or all components of the second transmission with the exception of one or more components of the second transmission which have little or no effect on its function. Alternatively, the second transmission may comprise substantially all the components of the first transmission. As another alternative, neither transmission may comprise substantially all the components of the other.

The first transmission and the second transmission may be substantially the same entity.

In one embodiment, the blind-riveting apparatus may further comprise: a nose tip configured to support the body of said blind rivet; and a third transmission configured, when engaged, to convert rotary motion of the motor into linear motion of at least the nose tip, wherein the transmission control apparatus is arranged to also selectively adjust the degree of engagement of the third transmission. The nose tip may or may not take the form of a nose piece as described above.

In the above embodiment, the second transmission may be comprised within the third transmission. Alternatively or in addition, the second transmission and the third transmission may be substantially the same entity.

The optional features disclosed herein in relation to the second transmission may also be applicable to the third transmission, and vice versa.

In the above embodiment, the third transmission may comprise a first threaded member connected to the motor and a second threaded member connected to the nose tip, the threads of the first and second threaded members being arranged to directly or indirectly act on each other to convert rotation of the first threaded member relative to the second threaded member into linear motion of the second threaded member.

According to a second aspect of the invention there is provided a method of blind riveting, the method comprising: securing the mandrel of a blind rivet in a clamp, the clamp being movable substantially along the axis of the mandrel; bringing the rivet into contact with a workpiece; causing the rivet to rotate under action of a first transmission, the first transmission, when engaged, transferring rotary motion of a motor to the rivet; driving the rivet into the workpiece; and withdrawing the clamp under action of a second transmission, the second transmission, when engaged, translating rotary motion of the motor into linear motion of the clamp, thereby pulling on the mandrel and upsetting the rivet, wherein the degree of engagement of at least one of the first and second transmissions is selectively adjustable by a transmission control apparatus arranged to selectively adjust the degree of engagement of a variable-influence brake or variable-influence clutch.

In addition to the advantages already discussed in relation to the first aspect of the invention, the method of the second aspect of the invention may provide further improvements. For instance, as well as the time saving offered by mitigating the need for the pre-drilling required for conventional blind riveting, rotating the rivet so as to soften the workpiece through frictional heating may allow blind rivets to be used with workpiece materials that would be too hard or brittle to be pre-drilled economically. Furthermore, part or all of the rivet may also be softened by the frictional heating. This may allow rivets made of a material too hard or brittle to be upset at room temperature to be utilised. This greater flexibility in choice of rivet material could allow other rivet properties such as strength, lightness or corrosion resistance to be more fully optimised.

The degree of engagement of both the first and second transmissions may be selectively adjusted by the transmission control apparatus.

The blind rivet may be caused to rotate before and/or simultaneously as and/or after it contacts the workpiece.

The clamp may rotate the blind rivet by rotationally driving a nose piece, the nose piece rotationally driving the blind rivet.

The performance of an apparatus used in the method may be monitored by a controller via one or more sensors.

Feedback on the status or dynamic performance of an apparatus used in the method may be gathered by a controller through one or more sensors, the controller calculating and/or implementing real-time adjustments to said status or dynamic performance of the apparatus.

According to a third aspect of the invention there is provided a blind riveting apparatus comprising: a motor; a mandrel driver configured to rotationally engage a mandrel of a blind rivet; a body driver configured to rotationally engage with the body of said blind rivet; a first transmission configured, when engaged, to transfer rotary motion of the motor to the mandrel driver; a second transmission configured, when engaged, to transfer rotary motion of the motor to the body driver; and a transmission control apparatus arranged to selectively adjust the degree of engagement of at least one of the first and second transmissions, and thereby control relative rotation of the mandrel driver and the body driver.

The third aspect of the invention may provide one or more of the advantages outlined in relation to the first aspect of the invention. In addition, the apparatus applying only rotational forces and motions means that it may avoid being subjected to high axial forces and may therefore be smaller, lighter, cheaper and/or in need of less frequent maintenance. Furthermore, without the need for a mechanism to translate rotary motion from the motor into linear motion of the mandrel to be incorporated within it, the apparatus may be mechanically simpler and therefore smaller, lighter, cheaper and/or in need of less frequent maintenance.

The transmission control apparatus may be arranged to selectively adjust the degree of engagement of both the first and second transmissions, and/or be arranged to selectively adjust the degree of engagement of said transmission or transmissions to any degree of engagement within the operable range of the transmission, and/or be arranged to selectively adjust the degree of engagement of said transmission or transmissions between fully disengaged and fully engaged states.

The transmission control apparatus may be configured to selectively adjust the degree of engagement of said transmission or transmissions by directly or indirectly rotationally coupling the mandrel driver and the body driver.

The transmission control apparatus may comprise a variable-influence clutch.

The variable-influence clutch may comprise a volume of magneto-rheological or electro-rheological fluid retained in a cavity between the components to be rotationally coupled by the clutch, the clutch further comprising an electric or magnetic field generator arranged to selectively apply an electric or magnetic field to the volume of fluid in order to alter the viscosity of the fluid.

The transmission control apparatus may be configured to selectively adjust the degree of engagement of the second transmission by controlling the amount of slip permitted by the variable-influence clutch.

The transmission control apparatus may comprise a variable-influence brake system.

The variable-influence brake system may comprise a volume of magneto-rheological or electro-rheological fluid retained in a cavity between a rotationally fixed component and a rotational component, the variable-influence brake system further comprising an electric or magnetic field generator arranged to selectively apply an electric or magnetic field to the volume of fluid in order to alter the viscosity of the fluid.

The transmission control apparatus may be configured to selectively adjust the degree of engagement of the second transmission by controlling the amount of slip permitted by the variable-influence brake system.

The apparatus may further comprise a controller configured to monitor the performance of the apparatus via one or more sensors.

The apparatus may further comprise a controller configured to gather feedback on the status or dynamic performance of the apparatus via one or more sensors, and calculate and/or implement real-time adjustments to said status or dynamic performance of the apparatus.

The apparatus may be configured to be capable of accommodating the force/motion timings that may be required for any reasonable process profile.

The apparatus may further comprise a third transmission configured, when engaged, to convert rotary motion of the motor into linear motion of the body driver, and wherein the transmission control apparatus is arranged to also selectively adjust the degree of engagement of the third transmission. The third transmission may comprise a first threaded member connected to the motor and a second threaded member connected to the body driver, the threads of the first and second threaded members being arranged to directly or indirectly act on each other to convert rotation of the first threaded member relative to the second threaded member into linear motion of the second threaded member.

According to a fourth aspect of the invention there is provided a method of blind riveting, the method comprising: rotationally engaging a mandrel of a blind rivet with a mandrel driver, and rotationally engaging a body of the blind rivet with a body driver; bringing the rivet into contact with a workpiece; causing the mandrel driver to rotate under action of a first transmission, the first transmission, when engaged, transferring rotary motion of a motor to the mandrel driver; causing the body driver to rotate in unison with the mandrel driver under action of a second transmission, the second transmission, when engaged, transferring rotary motion of said motor to the body driver; driving the blind rivet into the workpiece; and providing relative rotation of the mandrel driver and the body driver, thereby rotating the mandrel of the blind rivet relative to the body and upsetting the rivet, wherein the relative rotation of the mandrel driver and the body driver is provided by a transmission control apparatus selectively adjusting the degree of engagement of at least one of the first and second transmissions.

The fourth aspect of the invention may provide one or more of the advantages outlined in relation to the second or third aspects of the invention.

The degree of engagement of both the first and second transmissions may be selectively adjusted by the transmission control apparatus.

The mandrel driver and body driver may be caused to rotate in unison before and/or simultaneously as and/or after the blind rivet contacts the workpiece.

The performance of an apparatus used in the method may be monitored by a controller via one or more sensors.

Feedback on the status or dynamic performance of an apparatus used in the method may be gathered by a controller through one or more sensors, the controller calculating and/or implementing real-time adjustments to said status or dynamic performance of the apparatus.

In the above aspects of the invention, where a transmission comprises first and second threaded members, the threads of the first and second threaded members may be configured to rotationally couple the first and second threaded members through frictional resistance therebetween, thereby reducing the degree of engagement of said transmission, and the threads may be configured to alter the degree of frictional resistance offered in response to an alteration in axial loading of the threads.

Where this is the case, the apparatus may further comprise a resilient member configured to apply load to the threads of one or both of the threaded members, and/or a linear brake arranged to resist axial motion of the second threaded member and thereby apply a load to the threads of one or both of the first and second threaded members.

In any transmission which comprises first and second threaded members, said transmission may further comprise one or more intermediate threaded members each in threaded engagement with both the first and second threaded members, the first and second threaded members being configured to act on each other through the one or more intermediate threaded members. In such an arrangement, a resilient member configured to apply load to the threads of one or both of the threaded members may act directly or indirectly on the intermediate threaded members. The resilient member may be configured to apply load to the threads by urging the intermediate threaded members axially relative to the first and/or second threaded members, radially towards the first or second threaded member, or in any other suitable direction.

According to fifth aspect of the invention there is provided a method of manufacturing a product, the method comprising fastening together two or more layers of a workpiece using the apparatus of the first and/or third aspects of the invention.

According to a sixth aspect of the invention there is provided a product comprising a workpiece formed from two or more layers fastened together using the apparatus of the first and/or third aspects of the invention, and/or the method of the second, fourth and/or fifth aspects of the invention.

In relation to the fifth and sixth aspects of the invention, the product may be a vehicle (such as a motorcycle, car, van, lorry or aircraft). Examples of layers of a workpiece include the chassis of a vehicle, thermal/acoustic insulation panels and vehicle bodywork panels.

The described and illustrated embodiments are to be considered as illustrative and not restrictive in character, it being understood that only the preferred embodiments have been shown and described and that all changes and modifications that come within the scope of the invention as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

DETAILED DESCRIPTION

Specific embodiments of the present invention will now be described, by way of example only, with reference to the accompanying drawings in which.

Figure 1:
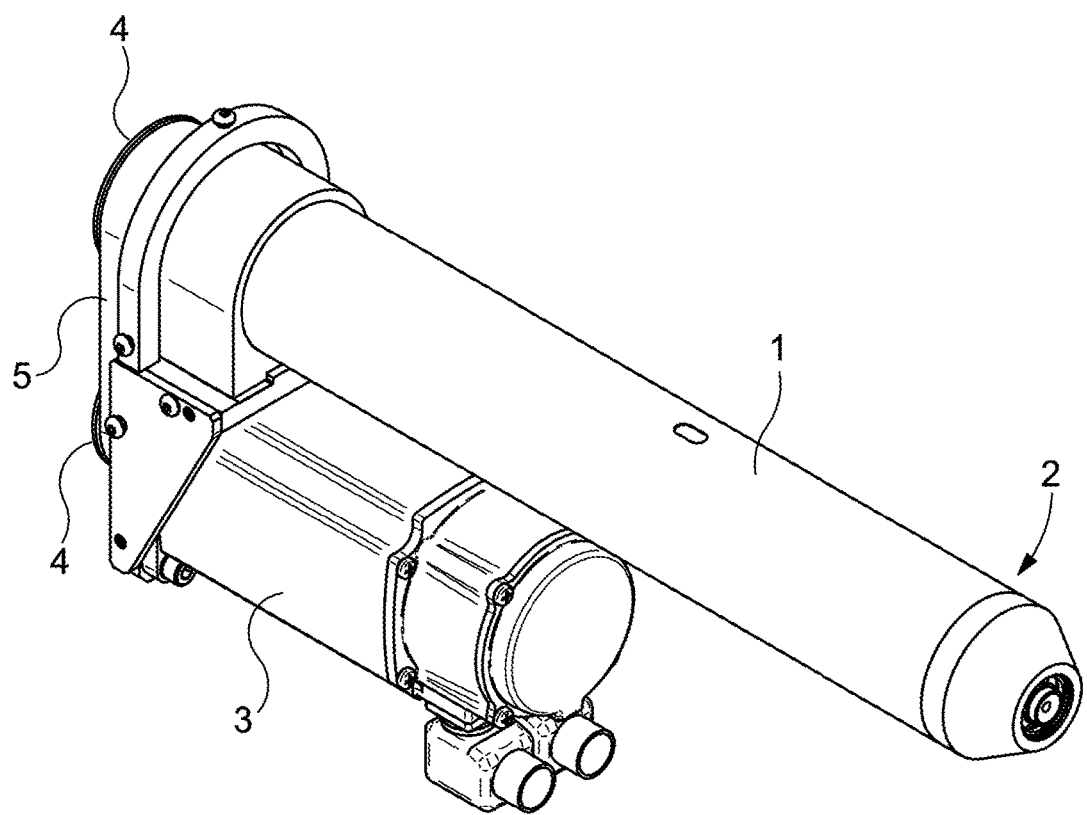
FIG. 1 is a perspective view of an apparatus according to a first embodiment of the invention.

Referring now to the drawings, FIG. 1 shows the layout of a blind riveting apparatus of a first embodiment of the invention. The first embodiment is an embodiment of the first and second aspects of the invention. The apparatus has a housing 1, which is fitted to the end of a robotic arm (not shown) and terminates in a nose 2. At the far end of the housing 1 from the nose 2 is a motor 3, which is connected to the components within the housing by pulleys 4 and a drive belt 5.

Figure 2:
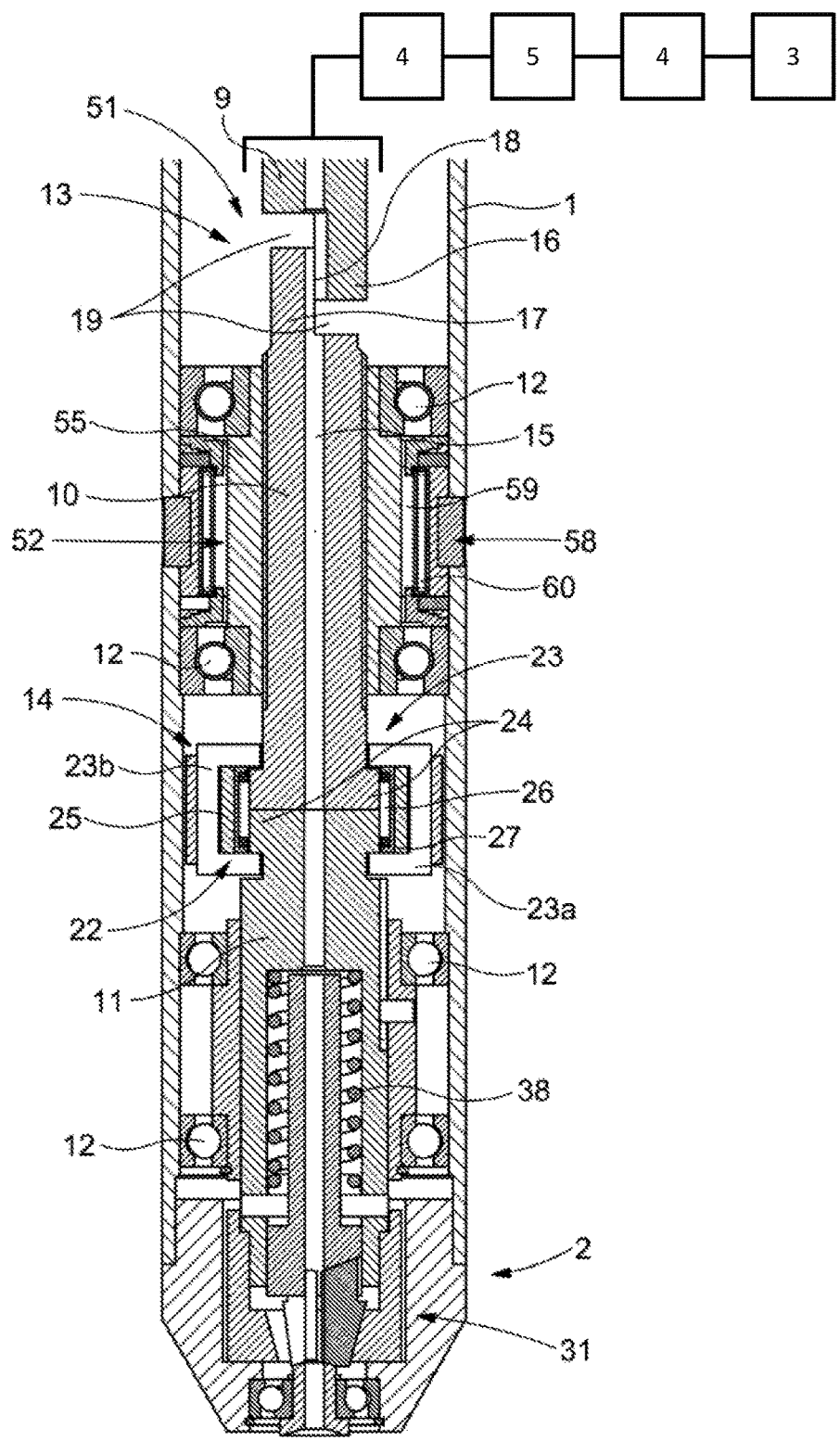
FIG. 2 is a cutaway side view of the apparatus of the first embodiment of the invention.

FIG. 2 is a cross section through the housing 1. The apparatus has a drive shaft 9, intermediate shaft 10 and distal shaft 11. The three shafts 9, 10, 11 are coaxially arranged and are able to rotate within bearings 12. The intermediate shaft 10 and distal shaft 11 are able to move axially but the drive shaft 9, which is driven by the motor (not visible) through the pulleys (not visible), is axially fixed. FIG. 2 shows the intermediate 10 and distal 11 shafts at the distal limit of their axial travel (i.e. the lowermost position when the apparatus is in the orientation shown). The intermediate shaft 10 is connected to the drive shaft 9 by a non-restraining coupling 13, and is connected to the distal shaft 11 by a restraining coupling 14. A central bore 15 is provided through the three shafts 9, 10, 11 and the two couplings 13, 14, through which the detached portions of mandrels of previously driven blind rivets (not visible) can travel from the nose 2. The central bore 15 leads to a collection bin (not visible) where the detached mandrel portions are stored before disposal.

The non-restraining coupling 13 comprises interlocking axial projections extending from the drive shaft 9 and intermediate shaft 10. In the apparatus of the first embodiment the drive shaft 9 has a single axial projection 16 and the intermediate shaft 10 also has a single axial projection 17. Each axial projection 16, 17 takes the form of a semicircular prism. The flat sides of the projections contact each other and define a coupling interface 18. There is an axial gap 19 between each shaft 9, 10 and the distal end the projection 16, 17 of the other shaft. This gap allows the intermediate shaft 10 to move axially towards the drive shaft 9 (as discussed later) when required.

The restraining coupling 14 comprises a one-directional clutch 22 and a restraint housing 23. The restraint housing 23 permits relative rotation of the intermediate shaft 10 and distal shaft 11, but overlies radial flanges 24 on the ends of the shafts and therefore prevents any substantial axial separation of the shafts. The restraint housing 23 comprises two diametrically opposed halves 23a, 23b, clamped together by a circular band 25. The restraining coupling 14 is axially movable such that while the intermediate 10 and distal 11 shafts are prevented from separating, they are not prevented from moving together in the axial direction. The one-directional clutch 22 is configured to permit rotation of the intermediate shaft 10 in either direction, but only transfer the motion of the intermediate shaft to the distal shaft 11 if the rotation of the intermediate shaft is in one direction. For the sake of clarity, in the remainder of the description rotation of the intermediate shaft 10 in the direction which is transferred to the distal shaft 11 will be referred to as 'forwards' and the opposite direction as 'backwards'.

Figure 3:
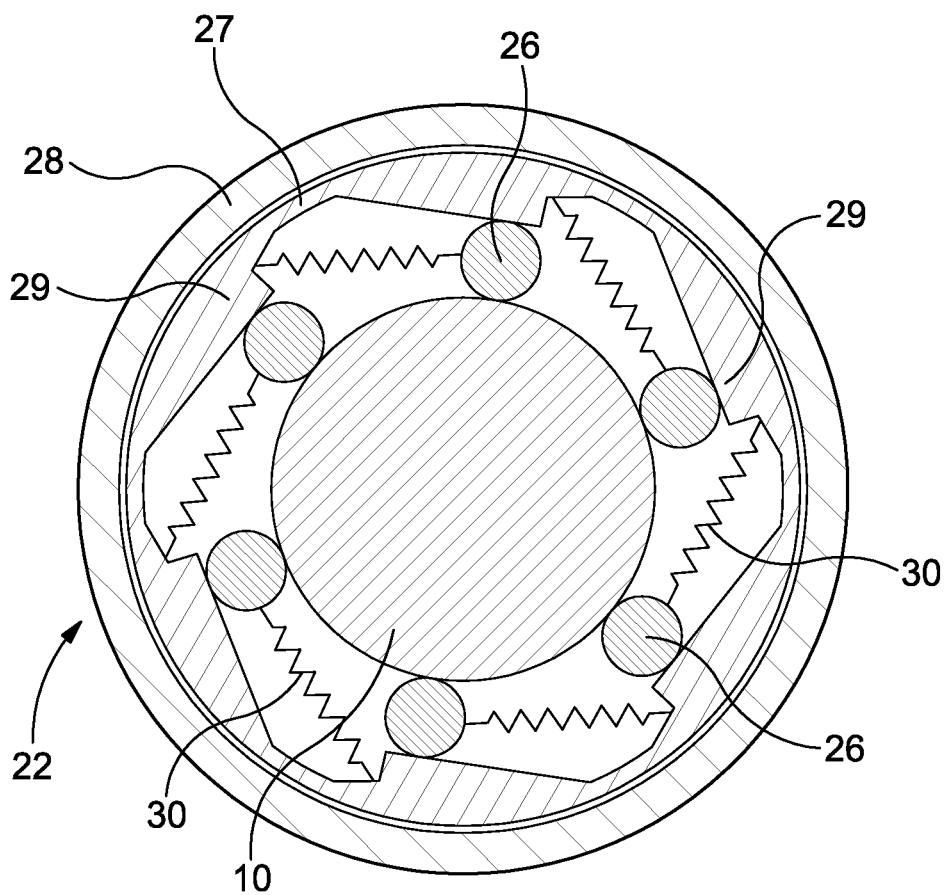
FIG. 3 is a illustrative diagram demonstrating the basic layout of a one-directional frictional clutch of the first embodiment.

FIG. 3 shows a simplified cross-sectional view of the one-directional clutch 22. The intermediate shaft 10 is received within a cup 27, which itself is held within a rotatable clutch housing 28. Inside the cup 27 is a cage (not shown) with a number of rollers 26, each of which lies adjacent to a ramped portion 29 of the cup. Each roller 26 is also connected to a spring 30, which biases the roller up the corresponding ramped portion 29 (i.e. towards the end of the ramp furthest from the outer periphery of the cup) until it contacts the intermediate shaft 10. Although FIG. 3 shows the springs 30 attached to the cup 27, in other embodiments the springs 30 may be attached to or integral with the cage (not visible). When the shaft 10 spins forwards, which corresponds to clockwise in FIG. 3, the shaft rolls the rollers 26 further up the ramped portions 29. This jams the rollers 26 tightly between intermediate shaft 10 and the cup 27, so as the shaft continues to rotate the cup is driven by the shaft through the rollers and rotates similarly. In addition, as the rollers 26 move up the ramped portions 29 under action of the intermediate shaft 10 they are also forced into driving engagement with the distal shaft 11 (which also projects into the space between the rollers, as shown in FIG. 2). As the intermediate shaft 10 rotates, the rollers 26, cup 27, housing 28 and distal shaft 11 therefore all rotate similarly.

When the intermediate shaft 10 rotates backwards (anti-clockwise in FIG. 3), the rollers 26 are rolled down the ramps 29 against the bias of the springs 30. This allows the intermediate shaft 10 to 'freewheel', lightly supported by the rollers 26, without the cup 27 and housing 28 rotating. In addition, as the rollers 26 move down the ramps 29 under action of the intermediate shaft 10 they are also moved away from the distal shaft 11. The distal shaft 11 is therefore not caused to rotate.

Figure 4:
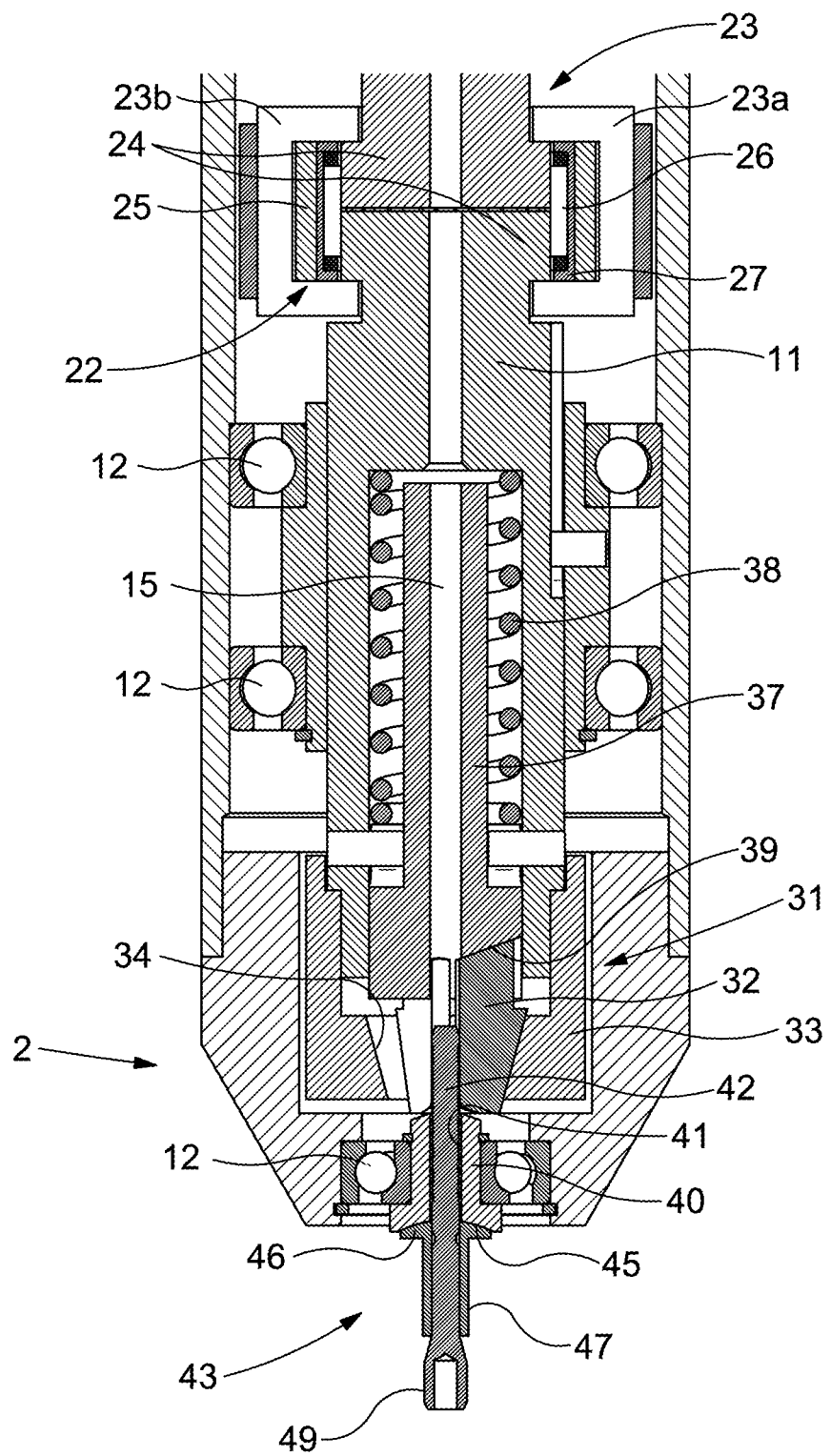
FIG. 4 is an enlarged cutaway side view of a nose of the first embodiment.

Turning now to FIG. 4, the components in the nose of the tool are shown in more detail. The distal shaft 11 is rotationally and axially fixed to a clamp 31, which is configured to pull on the mandrel 42 of a blind rivet 43 along the axis of the mandrel in order to upset the blind rivet. The clamp 31 comprises a plurality of jaws 32 received within a clamp block 33. The clamp block 33 has a frustro-conical clamp closing surface 34 positioned such that axially rearward (towards the driveshaft 9) motion of the clamp block with respect to the jaws 32 causes the clamp closing surface to cam the jaws towards each other. The distal shaft 11 also contains a clamp release block 37 which is axially slidable within a cavity in the distal shaft and is biased towards the jaws 32 by a release spring 38. The clamp release block 37 has a clamp opening surface 39 positioned such that axially forward (away from the driveshaft 9) motion of the clamp release block with respect to the jaws 32 causes the clamp opening surface to cam the jaws apart from each other. The central bore 15 also extends through the clamp release block 37.

At the tip of the nose 2 of the apparatus is a nose piece 40 which is axially fixed but freely rotatable. The nose piece 40 has a central bore 41 through which the mandrel 42 of a blind rivet 43 can be inserted into the jaws 32, and a head engagement surface 45 for supporting the head 46 of the rivet body 47. The nose piece 40 is also supported by a bearing 12.

Returning to FIG. 2, a first transmission 51 of the apparatus of the first embodiment is configured to enable the clamp 31 (and therefore a blind rivet 43 held in its jaws) to rotate by transferring rotary motion of the motor to the clamp when the first transmission is engaged by a transmission control apparatus. The first transmission 51 comprises the drive shaft 9, non-restraining coupling 13, intermediate shaft 10 and the distal shaft 11. To rotate the clamp 31, the drive shaft 9 and intermediate shaft 10 (which are already rotationally coupled by the non-restraining coupling 13) are rotationally coupled to the distal shaft 11 so that rotation of the drive shaft causes the clamp to rotate. For the avoidance of doubt, two bodies being rotationally coupled refers to the bodies being joined in such a way that rotation of one of the bodies drives the other body to rotate. This driving relationship does not necessarily apply in both directions (i.e. if rotation of a first body drives a second body to rotate, rotation of the second body does not necessarily drive the first body to rotate).

A second transmission 52 of the apparatus of this embodiment is configured to enable the clamp 31 to move axially (i.e. along the axis of the input, intermediate and distal shafts 9, 10, 11, which is also the axis of the mandrel 42) by translating rotary motion of the motor into linear motion of the clamp. The second transmission 52 comprises the intermediate shaft 10 and a nut 55, which are threadedly engaged with each other to form a lead screw mechanism. The threads of the intermediate shaft 10 and the nut 55 are arranged to act directly on each other to introduce axial motion of the intermediate shaft in addition to its rotary motion when the intermediate shaft rotates relative to the nut. The second transmission 52 of the first embodiment converts rotary motion of the intermediate shaft 10 to linear motion of the clamp 31 by providing linear motion in addition to the rotary motion. The rotary motion of the intermediate shaft 10 is therefore not changed by the degree of engagement of the second transmission 52.

The nut is received within a variable-influence brake system 58. The variable-influence brake system 58 comprises an array of rotationally fixed brake pads 59 positioned around a rotational component, in this case the nut 55. On the far side of the brake pads 59 from the nut is a flexible bladder 60 with a fluid port (not visible) through which a fluid such as air or oil can be introduced. Introduction of fluid into the bladder 60 causes it to expand, which forces the brake pads 58 into frictional engagement with the nut 55 to apply the brake.

A transmission control apparatus of the first embodiment comprises the one-directional clutch 22 and the variable-influence brake system 58. The rotational movement of the clamp 31 is controlled through the one-directional clutch 22 and the linear motion of the clamp is controlled through the variable-influence brake system 58. Through the variable-influence brake system 58 and the one-directional clutch 22, the transmission control apparatus can selectively adjust the degree of engagement of the first 51 and second 52 transmissions as explained below.

Rotating the intermediate shaft 10 forwards (by rotating the motor and therefore the drive shaft 9 forwards) engages the first transmission 51 by rotationally coupling the intermediate shaft 10 and the distal shaft 11 through the one-directional clutch 22. The clamp 31 is rotationally fixed to the distal shaft 11, so the rotation of the intermediate shaft 10 also causes rotation of the clamp 31.

By controlling the direction of rotation of the intermediate shaft 10 (by controlling the direction of rotation of the motor), the degree of engagement of the first transmission 51 can be selectively varied. The amount of slip permitted by the one-directional clutch 22 (and thus the degree of engagement of the first transmission 51) can be varied only between from no slip at all being permitted and slip being completely unrestricted. When the intermediate shaft 10 is rotating forwards the clutch 22 does not permit any slip, so the first transmission is fully engaged and the clamp 31 rotates at the same speed as the intermediate shaft 10. When the intermediate shaft 10 is rotating backwards the clutch 22 does not restrict slip at all, so the first transmission is fully disengaged and the clamp 31 does not rotate at all.

Applying the variable-influence brake system 58 engages the second transmission 52 by restricting rotation of the nut 55. This provides relative rotation between the nut 55 and the intermediate shaft 10, which produces linear motion of the intermediate shaft. The clamp 31 is axially fixed to the intermediate shaft 10 via the distal shaft 11 and the restraining coupling 14, as outlined above. The linear motion of the intermediate shaft 10 therefore causes linear motion of the clamp 31. The direction of the linear motion depends on the direction of the threads of the nut 55 and the intermediate shaft 10 (and the direction of relative rotation of those components). In this embodiment, the release spring 38 resists any unintended axial movement of the distal shaft 11 that is caused by the rotational inertia of the nut 55 (or the lack thereof) causing it to rotate relative to the intermediate shaft 10. For instance, without the above action of the release spring 38 unintended axial movement may occur when the intermediate shaft 10 first begins to rotate but the nut 55 is not yet up to speed.

By controlling the amount of fluid in the bladder 60, the force pressing the brake pads 59 against the nut 55 can be selectively varied in order to control the amount of slip that is permitted between the brake pads and the nut, and thus control the degree of engagement of the second transmission 52. The amount of slip permitted by the brake system 58 (and thus the degree of engagement of the second transmission 52) can be varied from no slip at all being permitted, to slip being completely unrestricted, or anywhere in between. When no slip at all is permitted the second transmission 52 is fully engaged and one revolution of the intermediate shaft 10 causes it to move axially by a distance equal to the lead of the threads. When slip is completely unrestricted the second transmission is fully disengaged, as there is no relative rotation between the nut 55 and the intermediate shaft 10, so the intermediate shaft does not move axially.

A method of the first embodiment will now be described. This method utilises the above apparatus, and corresponding reference numerals will be used, however it is to be understood that other methods may use apparatus which falls outside the scope of first embodiment.

As stated previously, the transmission control apparatus selectively adjusts the degree of engagement of the first 51 and the second 52 transmissions through the variable-influence brake system 58 and the one-directional clutch 22. The transmission control apparatus is able to adjust the degree of engagement of the second transmission 52 to any degree of engagement between fully disengaged and fully engaged, and is able to adjust the degree of engagement of the first transmission 51 between fully disengaged and fully engaged states only.

Figure 5:
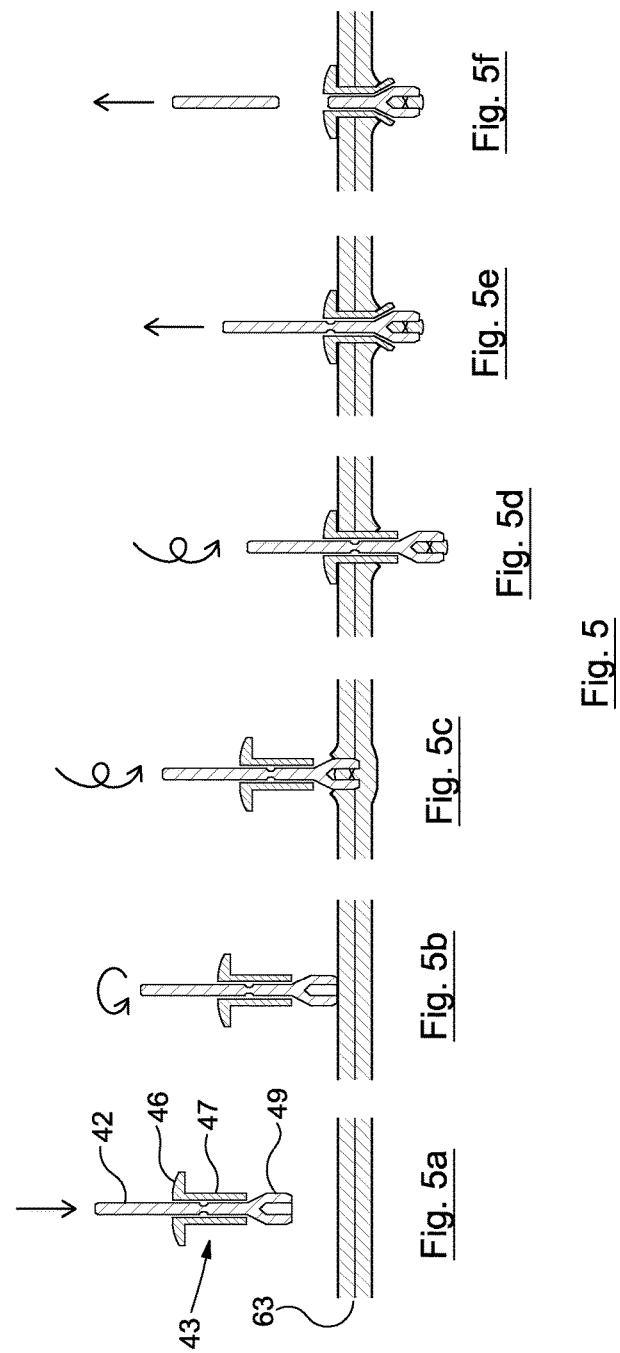
FIG. 5 is a series of cutaway side views of stages in a method according to the first embodiment, showing only a blind rivet and a workpiece.

FIG. 5 displays schematically the method of the first embodiment in stages shown as FIGS. 5a-5e, with only the rivet 43 and the workpiece 63 being visible. Referring to FIG. 5a in combination with FIGS. 2 and 4, to drive a blind rivet 43 into a workpiece 63, the rivet's mandrel 42 is mounted in the clamp 31 as explained below. The workpiece 63 is positioned in front of the nose 2 and the blind rivet 43, which are then advanced, along with the entire apparatus, by the robot arm or by a separate actuator (not visible) until the bulb 49 of the mandrel 42 contacts the workpiece.

By allowing fluid to exit the flexible bladder 60 so the brake pads 59 do not restrict movement of the nut 55, the variable-influence brake system 58 of the transmission control apparatus permits unrestricted slip. The second transmission 52 is therefore completely disengaged so rotation of the motor will not cause axial movement of the clamp 31. The motor is then energised such that it causes the drive shaft 9 to rotate forwards (as defined earlier). The rotation of the drive shaft 9 is transmitted to the intermediate shaft 10 through the non-restraining coupling 13. As the intermediate shaft 10 is rotating forwards, this rotation is transmitted to the distal shaft 11 by the one-directional clutch 22 of the transmission control apparatus, and the first transmission 51 is therefore fully engaged. Rotation of the distal shaft 11 causes the clamp 31 to rotate, which in turn causes the blind rivet 43 to rotate (as shown in FIG. 5b). The heat generated by the sliding friction between the blind rivet 43 and the workpiece 63 heats and softens the workpiece in the locality of the rivet.

As the blind rivet 43 continues to rotate, the robotic arm or separate actuator advances the apparatus further (as shown in FIG. 5c), driving the rivet through the workpiece 63 until the head 46 of the rivet 43 contacts the surface of the workpiece. This is shown in FIG. 5d. The motor is then stopped so the rivet 43 no longer rotates, and the workpiece 63 is allowed to cool if necessary.

To upset the blind rivet 43, the variable-influence brake assembly 58 is fully engaged to fully engage the second transmission 52. The motor is then energised to rotate the drive shaft 9 backwards. The rotation of the drive shaft 9 is transmitted to the intermediate shaft 10 through the non-restraining coupling 13. As the intermediate shaft 10 is rotating backwards this rotation is not transmitted to the distal shaft 11 by the one-directional clutch 22. The first transmission is therefore fully disengaged by the transmission control apparatus. The threads of the intermediate shaft 10 and nut 55 are arranged so that backwards rotation of the intermediate shaft when the second transmission 52 is engaged causes the intermediate shaft to move towards the drive shaft 9 (decreasing the size of the gaps 19 in the non-restraining coupling 13). The axial movement of the intermediate shaft 10 is transferred to the distal shaft 11 via the restraint housing 23. The distal shaft 11 (and thus the clamp 31) therefore moves towards the drive shaft 9. As the clamp block 33 is moved towards the drive shaft 9, the clamp closing surface 34 cams the jaws 32 together, tightening them around the mandrel. The mandrel therefore travels along its axis, towards the drive shaft 9 with the clamp 31. While the mandrel 42 is pulled towards the drive shaft 9, the body 47 of the blind rivet is axially restrained by the head engagement surface 45 of the nose piece 40. Pulling axially on the mandrel 42 while the body 47 of the blind rivet 43 remains stationary causes the bulb 49 of the mandrel to move towards the head 46 of the blind rivet, distorting the rivet body 47 and upsetting the rivet (as shown in FIG. 5*e*).

As the clamp 31 continues to pull on the mandrel 42 after the blind rivet 43 has been upset, the tension in the mandrel causes it to fracture (as shown in FIG. 5*f*). This completes the joining operation, and the apparatus is then moved away from the workpiece 63 by the robotic arm or the separate actuator so that another blind rivet 43 can be loaded.

Returning to FIGS. 2 and 4, to load a subsequent blind rivet 43, the clamp 31 is moved away from the drive shaft 9 again by rotating the intermediate shaft 10 forwards with the second transmission 52 engaged. Moving the clamp 31 away from the drive shaft 9 brings the jaws 32 into contact with the nose piece 40, which releases the jaws from the clamp closing surface 34. The jaws can then be cammed open by the clamp opening surface 39 of the clamp release block 37. As the jaws 32 open the mandrel 42 of a new blind rivet 43 can be inserted between them, through the bore 41 in the nose piece. The newly inserted mandrel 42 forces the detached mandrel portion (not visible) of the previous rivet along the central bore 48 towards the collection bin (not visible). Rotating the intermediate shaft 10 forwards with the variable-influence brake system 58 still engaged moves the clamp 31 back towards the drive shaft 9. The clamp closing surface 34 therefore moves the jaws 32 together again, mounting the mandrel 42 in the clamp 31 and completing the loading process.

Figure 6:
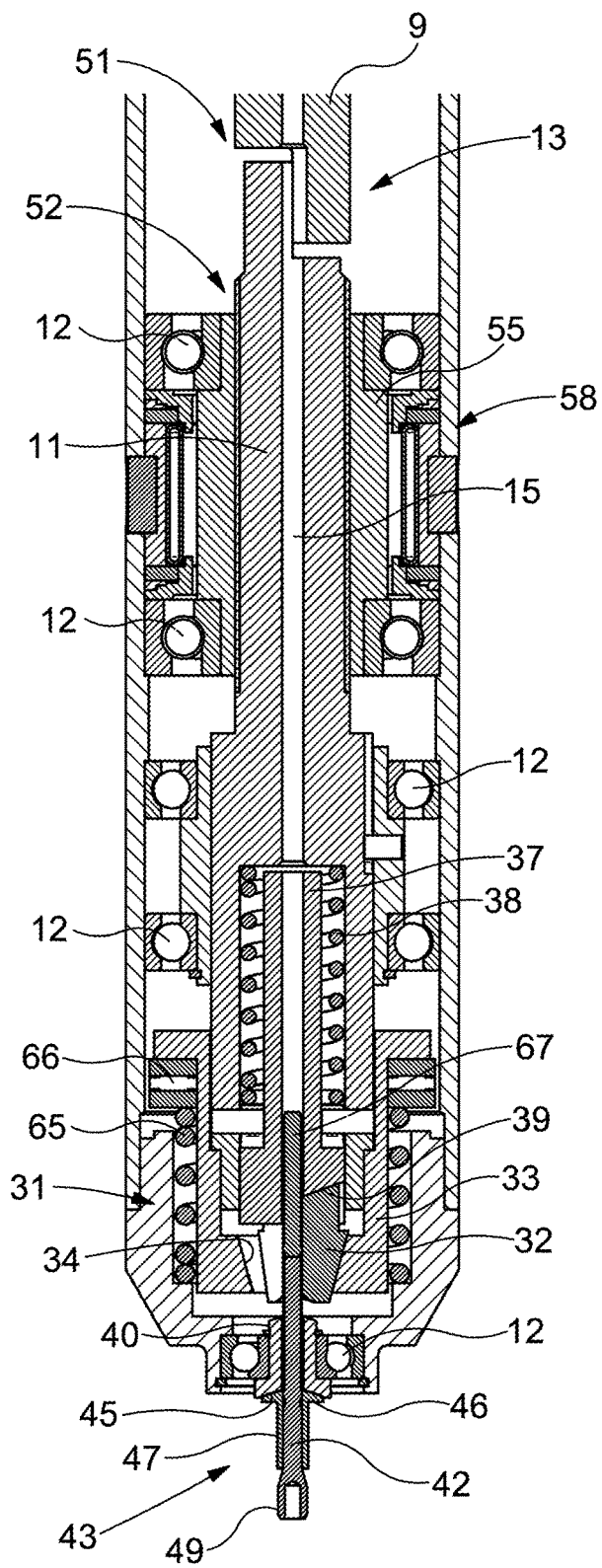
FIG. 6 is a cutaway side view of the apparatus of a second embodiment of the invention.

FIG. 6 shows an apparatus of a second embodiment of the invention. The second embodiment is another embodiment of the first and second aspects of the invention. Like the apparatus of the first embodiment, the apparatus of this embodiment has a drive shaft 6, a non-restraining coupling 13, a nut 55 positioned to be acted on by a variable-influence brake system 58, and a clamp 31 comprising jaws 32 and a clamp block 33 with a clamp closing surface 34. The apparatus of the second embodiment also has a clamp release block 37 with a clamp opening surface 39, a release spring 38 positioned to act on the clamp release block, a nose piece 40, bearings 12 and a central bore 15 in common with the first embodiment. The apparatus of the second embodiment is also mounted on a robotic arm (not visible). Discussion of the above features and their function will not be repeated in relation to this embodiment.

In this embodiment there is no intermediate shaft or restraining coupling. Instead, the distal shaft 11 extends all the way from the clamp 31 to the drive shaft 9, and it is the distal shaft that is threadedly engaged with the nut 55 and is connected to the driveshaft by the non-restraining coupling 13. In addition, the apparatus includes a buffer spring 65, configured to bias the clamp 31 (and therefore the distal shaft 11) towards the drive shaft 9. The buffer spring 65 acts on the clamp block 33 through a thrust bearing 66.

As with the first embodiment, the first transmission 51 of the second embodiment is configured to enable the clamp 31 (and therefore the blind rivet 43) to rotate by transferring rotary motion of the motor to the clamp when the first transmission is engaged by a transmission control apparatus. The first transmission 51 of the second embodiment comprises the drive shaft 9, non-restraining coupling 13 and the distal shaft 11. In this embodiment the first transmission 51 is permanently fully engaged, thus the clamp 31 is permanently rotationally coupled to the motor.

The second transmission 52 of this embodiment, like that of the first embodiment, is configured to enable the clamp 31 to move linearly by converting rotary motion of the motor into linear motion of the clamp. The second transmission 52 comprises the distal shaft 11 and the nut 55, which are threadedly engaged with each other to form a lead screw mechanism. The threads of the distal shaft 11 and the nut 55 are arranged to act directly on each other to introduce axial motion of the intermediate shaft, in addition to its rotary motion, when the intermediate shaft rotates relative to the nut. The second transmission 52 of the second embodiment provides linear motion as an addition, without decreasing the rotary motion of the shaft. The rotary motion of the distal shaft 11 is therefore not altered by the degree of engagement of the second transmission 52.

The transmission control apparatus of this embodiment comprises the variable-influence brake system 58, which is configured to control the linear motion of the clamp. Through the variable-influence brake system 58, the transmission control apparatus can selectively adjust the degree of engagement of the second transmission 52 to any degree between fully disengaged (i.e. the second transmission has no effect and the clamp does not travel axially) and fully engaged (i.e. each revolution of the distal shaft causes it to move axially by a distance equal to the lead of the thread).

In the second embodiment, the jaws 32 of the clamp 31 can be moved into driving engagement with the nose piece 40. This allows the jaws 32 to rotate the nose piece 40. By providing interlocking driving engagement features (not visible) on the head engagement surface 45 of the nose piece 40 and the head 46 of the blind rivet 43, the blind rivet can be driven to rotate by the clamp 31 through the nose piece. The driving engagement features of the second embodiment are a set of radial grooves on the nose piece 40 which engage with complementary radial ridges on the head 46 of the rivet 43. In this embodiment, the jaws 32 only reach driving engagement with the nose piece 40 when at their distal limit, i.e. while they are not gripping the mandrel 42 of the rivet 43 (because they are held open under action of the clamp release block 37). The blind rivet 43 is therefore driven by the clamp 31 exclusively through the nose piece 40. In other embodiments however, the clamp 31 may reach driving engagement with the nose piece 40 while maintaining its grip on the mandrel of the rivet 43. In such embodiments, the rivet would be driven by the clamp both directly, and indirectly through the nose piece 40. The clamp 31 has a retention mechanism (not visible) such as a magnet or ball detent to prevent the rivet falling out of the clamp while the clamp is not gripping the mandrel. In other embodiments, the jaws 32 may be brought into driving engagement with the nose piece 40 while remaining closed around the mandrel 42 of the blind rivet 43. In such embodiments, both the mandrel 42 and the body 47 of the blind rivet are driven simultaneously to rotate it.

A method of the second embodiment will now be described. This method utilises the above apparatus, and corresponding reference numerals will be used, however it is to be understood that other methods may use apparatus which falls outside the scope of second embodiment.

In use, the transmission control apparatus selectively adjusts the degree of engagement of the second 52 transmission through the variable-influence brake system 58. The transmission control apparatus is able to adjust the degree of engagement of the second transmission 52 to any degree of engagement between fully disengaged and fully engaged, but does not alter the degree of engagement of the first transmission 51. The first transmission 51 remains fully engaged throughout.

To drive a blind rivet 43 into a workpiece, the rivet is loaded into the clamp 31 while the jaws 32 remain open, as outlined below. The workpiece is positioned in front of the nose 3 and the blind rivet 43, which are then advanced (along with the entire apparatus) by the robot arm or by a separate actuator (not visible) until the bulb 49 of the mandrel 42 contacts the workpiece.

By fully disengaging the variable-influence brake system 58 of the transmission control apparatus so that it does not restrict slip at all, the nut 55 can rotate along with the distal shaft 11, meaning that no relative rotation will take place and no linear motion will be introduced. The second transmission 52 is therefore completely disengaged so rotation of the motor will not cause axial movement of the clamp 31. The motor is then energised such that it causes the drive shaft 33 to rotate in a first direction. The drive shaft 33 rotates the distal shaft 11, which in turn rotates the clamp 31. The jaws 32 of the clamp 31 rotate the nose piece 40 (as explained previously), which rotates the body 47 of the blind rivet 43. The body 47 and the mandrel 42 may have engagement features such as splines in order to ensure that they rotate together even when the bulb 49 is in contact with a workpiece, or they may be arranged such that the friction between the two components is sufficient for this purpose. The heat generated by the sliding friction between the rotating blind rivet 43 and the workpiece heats and softens the workpiece in the locality of the rivet.

The threads of the distal shaft 11 and nut 55 are arranged so that rotation of the shaft relative to the nut in the first direction causes the shaft to move linearly away from the drive shaft 9. If the distal shaft 11 was axially free, a degree of relative rotation between the shaft and the nut 55 may take place due to the nut being slowed by frictional resistance. However, the buffer spring 65 biasing the distal shaft 11 towards the drive shaft 9 prevents this frictional resistance from causing the distal shaft to move away from the distal shaft. The action of the buffer spring 65 also counteracts any unintended axial movement of the clamp 31 due to inertial effects of a change in speed of the distal shaft 11 and the nut 55 relative to one another.

As the blind rivet 43 continues to spin in contact with the workpiece, the robotic arm or separate actuator advances the apparatus further, driving the rivet through the workpiece until its head 46 contacts the surface of the workpiece. The motor is then stopped so the rivet 43 no longer rotates, and the workpiece is allowed to cool if necessary.

To upset the blind rivet 43, the variable-influence brake assembly 58 is fully engaged to prevent any rotation of the nut 55, fully engaging the second transmission 52. The motor is then energised to rotate the drive shaft 9 in a second direction which is opposite to the first direction defined above. The rotation of the drive shaft 9 is transmitted to the distal shaft 11 through the non-restraining coupling 13. Rotation of the distal shaft 11 in the second direction relative to the nut 55 causes the distal shaft, and therefore the clamp 31, to move towards the drive shaft 9 (while the distal shaft continues to rotate, since the first transmission 51 is constantly fully engaged).

As the clamp block 33 is moved towards the drive shaft 9, the clamp closing surface 34 cams the jaws 32 together, tightening them around the mandrel 43. The mandrel 42 therefore travels towards the drive shaft 9 with the clamp 31. While the mandrel 42 is pulled towards the drive shaft 9, the body 47 of the blind rivet is axially restrained by the head engagement surface 45 of the nose piece 40. Pulling on the mandrel 42 while the body 47 of the blind rivet 43 remains stationary causes the bulb 49 of the mandrel to move towards the head 46 of the blind rivet, distorting the rivet body 47 and upsetting the rivet. Because the clamp 31 continues to pull on (and rotate) the mandrel 42 after the rivet 43 has been upset, the tension in the mandrel causes it to fracture. This completes the joining operation, and the apparatus is then moved away from the workpiece by the robotic arm or the separate actuator so that another blind rivet 43 can be loaded.

To load a subsequent blind rivet 43, the clamp 31 is moved away from the drive shaft 9 again by rotating the distal shaft 11 in the first direction with the second transmission 52 engaged. Moving the clamp 31 away from the drive shaft 9 brings the jaws 32 into contact with the nose piece 40, which releases them from the clamp closing surface 32 (as explained in relation to the first embodiment). This also brings the jaws 32 into driving engagement with the nose piece 40, as explained above. Having been released from the action of the clamp closing surface 32, the jaws can be cammed open by the clamp opening surface 39 of the clamp release block 37. As the jaws 32 open, the mandrel 42 of a new blind rivet 43 can be inserted between them through the bore 41 in the nose piece 40. The newly inserted mandrel 42 forces the detached mandrel portion 67 of the previous rivet along the central bore 15 towards the collection bin. Whereas in the first embodiment the jaws 32 are then closed around the mandrel 42, in the second embodiment they remain open. The freshly inserted blind rivet 43 is held in the open jaws 32 of clamp 31 by a retention mechanism (not visible) such as a magnet or a ball detent.

Figure 7:
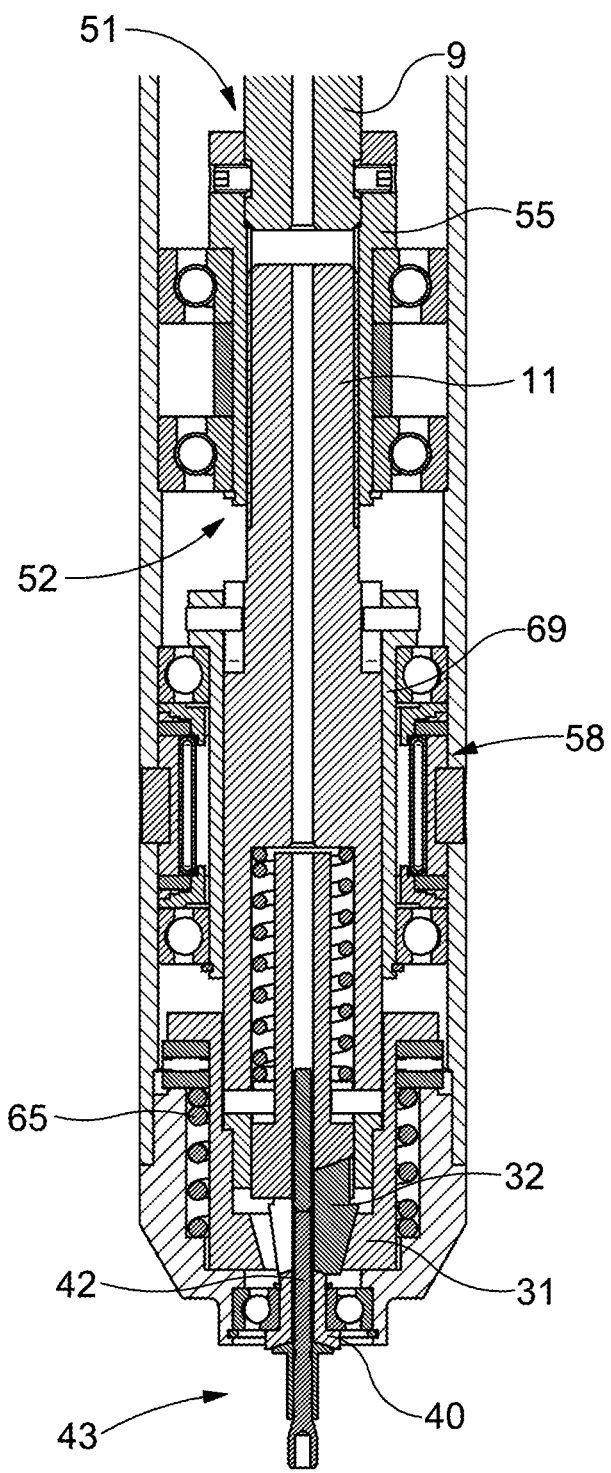
FIG. 7 is a cutaway side view of the apparatus of a third embodiment of the invention.

FIG. 7 shows an apparatus of a third embodiment of the invention. The third embodiment is another embodiment of the first and second aspects of the invention. The structure and function of the apparatus of the third embodiment is notably similar to that of the second embodiment, therefore only the differences the apparatus will be described.

In the third embodiment there is no non-restraining coupling linking the drive shaft 9 to the distal shaft 11. Instead, the drive shaft 9 is connected to the distal shaft 11 via the nut 55. The nut 55 is rotationally and axially fixed to the drive shaft 9 such that it can be driven by the drive shaft, and is threadedly engaged with the distal shaft 11. As in the second embodiment, the second transmission 52 comprises the drive shaft 9, nut 55 and distal shaft 11, which form a lead screw mechanism. In the lead screw mechanism of the third embodiment, relative rotation of the nut 55 and distal shaft 11 is converted into linear movement of the shaft within the nut. The clamp 31, being axially fixed to the distal shaft, is arranged to move linearly with the distal shaft 11.

The first transmission 51 of the apparatus of the third embodiment comprises the drive shaft 9, the nut 55 and the distal shaft 11. The first transmission 51 therefore comprises all the components of the second transmission 52, and more particularly, the first and second transmissions are the same entity. The nut 55, which is rotationally coupled to the drive shaft 9, can be rotationally coupled to the distal shaft 11 through friction in the engaged threads of the nut and the distal shaft in order to engage the first transmission 51.

The transmission control apparatus of the third embodiment comprises the variable influence brake system 58. Rather than acting on the nut 55 as in the second embodiment, the variable-influence brake system 58 of this embodiment acts on the distal shaft 11 through an axially fixed rotary sleeve 69. The distal shaft 11 can move axially within the sleeve 69 but is rotationally coupled to it, so that the brake 58 restricting the slip of the sleeve also restricts the rotation of the distal shaft. When the brake 58 restricts the slip of the sleeve 69, relative rotation between the nut 55 and the distal shaft 31 is produced. This decreases the engagement of the first transmission 51 and increases the engagement of the second transmission 52.

The degrees of engagement of the first transmission 51 and the second transmission 52 can be varied to any degree between fully disengaged and fully engaged by the variable-influence brake system 58 of the transmission control apparatus. The degree of engagement of the first transmission 51 is determined by the degree to which the distal shaft 11 rotates in unison with the nut 55, and the degree of engagement of the second transmission 52 is determined by the amount of relative rotation of the distal shaft and the nut. The degrees of engagement of the first and second transmissions are therefore inversely proportional, i.e. when one transmission is fully engaged the other is fully disengaged, when one transmission is almost fully disengaged the other is almost fully engaged, etc.

A method of the third embodiment will now be described. This method utilises the above apparatus, and corresponding reference numerals will be used, however it is to be understood that other methods may use apparatus which falls outside the scope of third embodiment. As stated above, as the structure and function of the apparatus of the third embodiment is notably similar to that of the second embodiment, therefore only the differences in its use will be described.

The transmission control apparatus selectively adjusts the degree of engagement of the first 51 transmission, and also the degree of engagement of the second transmission 52, through the variable-influence brake system 58. The transmission control apparatus is able to adjust the degree of engagement of both transmissions 51, 52 to any degree of engagement between fully engaged and fully disengaged.

To rotate the blind rivet 43, the variable-influence brake system 58 does not restrict slip of the distal shaft 11. This fully engages the first transmission 51 and fully disengages the second transmission 52. The motor is then energised, which rotates the drive shaft 9 and therefore the nut 55 in a first direction (which may or may not be the same direction as the first direction referred to in relation to the second embodiment). Friction in the threads of the nut 55 and the distal shaft 11 causes the distal shaft (and therefore the clamp 31 and rivet 43) to rotate similarly. As in the second embodiment, any unintended axial movement of the distal shaft 11 is resisted by the biasing force from buffer spring 65.

To upset the rivet 43 after the workpiece has been softened and the rivet driven, the variable-influence brake system 58 is applied to restrict slip of the distal shaft 11 by restricting slip of the rotational sleeve 69. This fully disengages the first transmission 51 and fully engages the second transmission 51. The motor is then energised to rotate the drive shaft 9 (and therefore the nut 55) in a second direction opposite to the first direction. This causes axial movement of the distal shaft 11, and therefore the clamp 31 and the mandrel 42 of the rivet 43, towards the drive shaft 9 and sets the rivet as described previously.

To load a subsequent blind rivet 43, the clamp 31 is moved away from the drive shaft 9 again by rotating the nut 55 in the first direction with the second transmission 52 engaged (due to the brake 58 restricting slip of the distal shaft 11). This opens the jaws 32 for receipt of the mandrel 42 of a subsequent blind rivet 43, and brings the jaws into driving engagement with the nose piece 40, as discussed previously.

An apparatus of a fourth embodiment of the invention will now be described. The fourth embodiment is an embodiment of the third and fourth aspects of the invention. Whereas the above embodiments of the first and second aspects of the invention are intended for use with blind rivets which are upset by pulling axially on the mandrel of the rivet, embodiments of the third and fourth aspects of the invention are intended for use with 'self-upsetting' blind rivets, which are upset by rotating the mandrel relative to the body.

Figure 8:
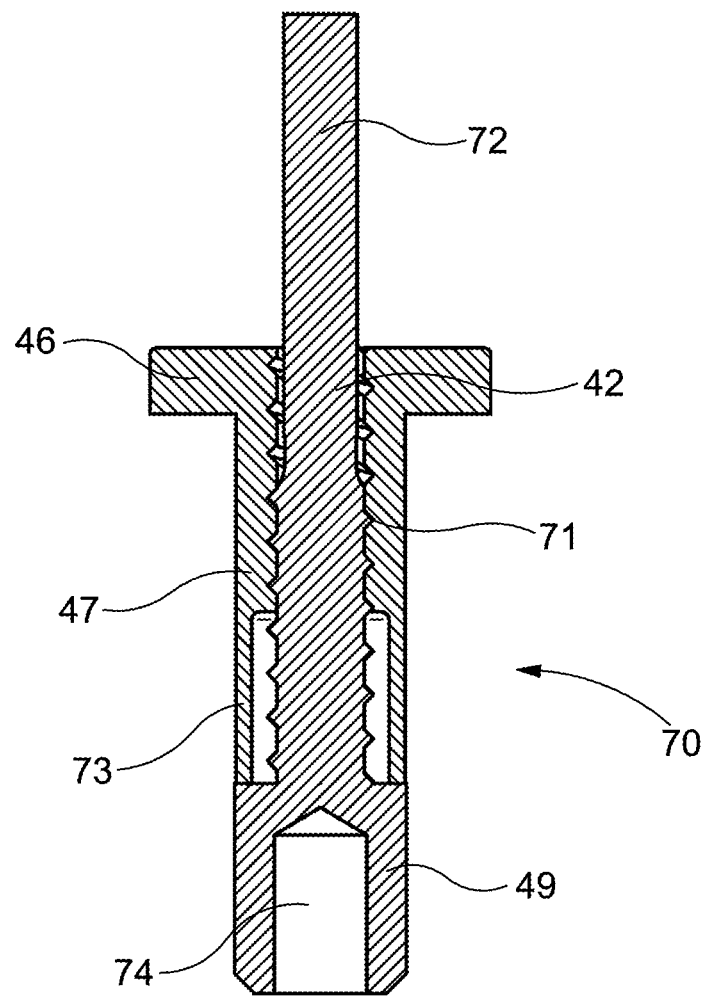
FIG. 8 is a cutaway side view of a 'self upsetting' blind rivet.

FIG. 8 shows a cross-section of an exemplary self-upsetting blind rivet 70. As with regular blind rivets it has a body 47 with a head 46, and a mandrel 42 with a bulb 49. The self-upsetting rivet 43 also has a threaded interface 71 between the mandrel 42 and the body 47, a drive engagement profile (not visible) on the opposite end 72 of the mandrel to the mandrel bulb 49, and drive engagement features (not visible) on the head 46 of the rivet. The drive engagement profile of the mandrel 42 and the drive engagement features of the head 46 allow rotation of mandrel and the body 47 to be independently controlled, as explained later. By rotating the mandrel 42 relative to the body 47, the threaded interface 71 converts this relative rotation to axial motion of the mandrel. This axial motion moves the bulb 49 towards the head 46, deforming the body 47 and upsetting the rivet. Further rotation applied to the end 72 of the mandrel 42 with the drive engagement profile causes the mandrel to fracture.

The body 47 of the self-upsetting blind rivet 70 is of a one-piece design, and has a stem which includes a section of decreased thickness 73. The section of decreased thickness 73 may decrease force required to upset the rivet 70. In general, the stem may be provided with a section which is more easily deformable than the remainder of the stem. The size, shape and/or position of this region may be selected to adjust the shape the rivet takes when it is upset. The bulb 49 of the rivet 70 has a cavity 74 positioned to receive workpiece material therein during insertion of the rivet. The cavity 74 is shaped and positioned to retain a plug of workpiece material displaced by the rivet 70, preventing the plug from detaching and interfering with the function of the finished component.

Figure 9:
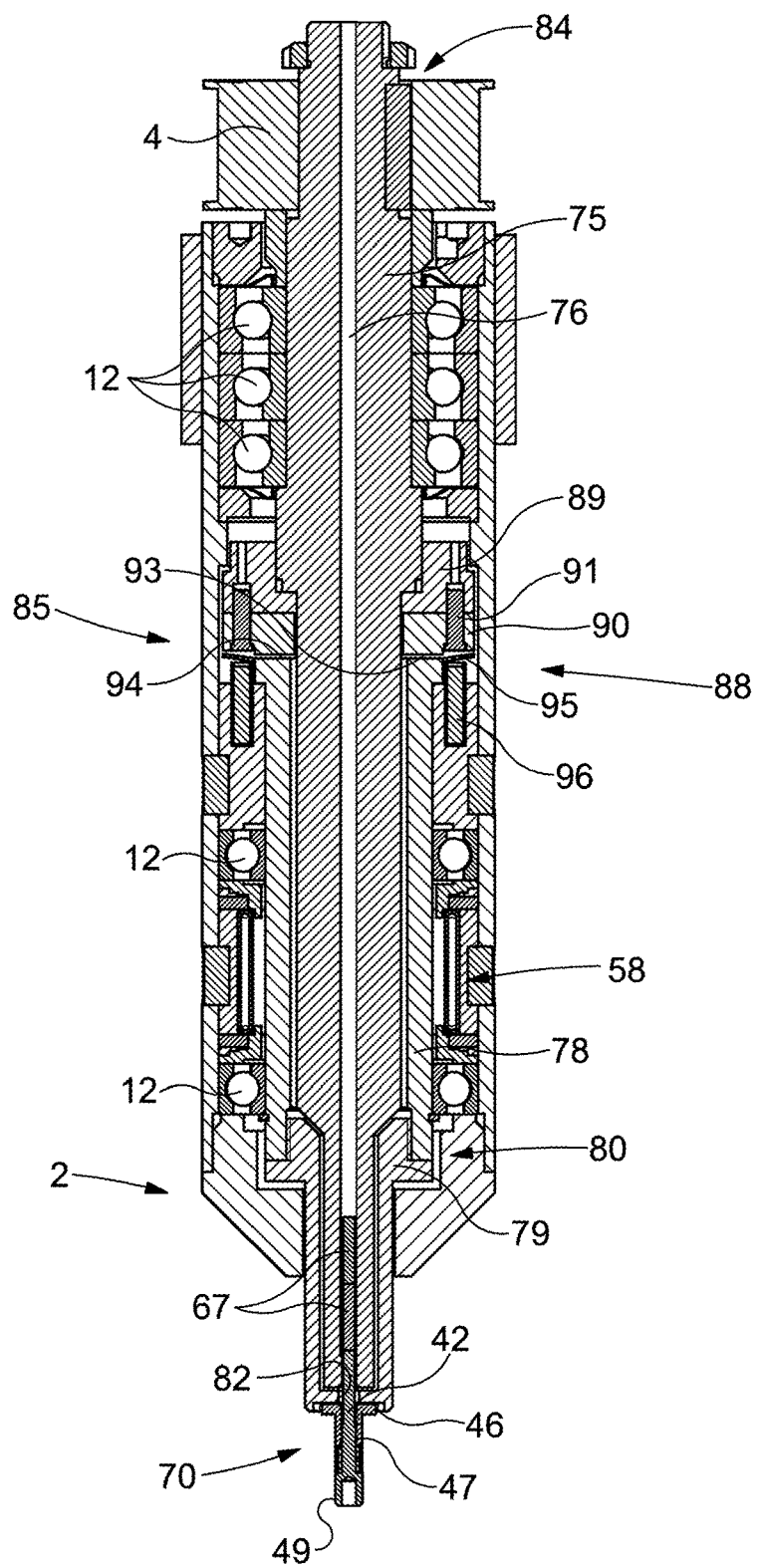
FIG. 9 is a cutaway side view of the apparatus of a fourth embodiment of the invention.

The apparatus of the fourth embodiment of the invention is shown in FIG. 9. Like previous embodiments of the invention, the apparatus of the fourth embodiment has a nose 2, a pulley 4 driven by a motor (not visible), support bearings 12, and a variable-influence brake system 58. The apparatus is also mounted on a robotic arm (not visible).

A mandrel driver 75 in the form of an elongate cylindrical shaft is axially fixed but is rotationally drivable by the motor via the pulley 4. The mandrel driver 75 has a longitudinal bore 76 through which the detached portions of mandrels 67 of previously driven blind rivets can travel from the nose 2, similar to the central bore of previous embodiments. The longitudinal bore 76 leads to a collection bin (not visible) where the detached mandrel portions 67 are stored before disposal.

At least the section of longitudinal bore 76 at the distal end of the mandrel driver 75 (i.e. the opposite end of the mandrel driver to the pulley 4) has a complementary profile to the drive engagement profile of the mandrel 42 of the self-upsetting rivet 70 to be driven. This section also has a retention mechanism (not visible) such as a magnet or a ball detent to prevent a mandrel 42 inserted into the bore 76 from falling out.

The distal end of the mandrel driver 75 is concentrically received within the tubular section 78 and nose piece 79 of a rotatable body driver 80. The tubular section 78 and nose piece 79 are axially and rotationally fixed to each other. The distal face of the nose piece 79 has drive engagement features (not visible) which engage with complementary drive engagement features (not visible) on the head 46 of the self-upsetting blind rivet 70. In the fourth embodiment, as with the second and third embodiments, the drive engagement features are a set of radial grooves on the nose piece 79 which engage with complementary radial ridges on the head 46 of the rivet 70. The distal end of the nose piece 79 also has a hole 82 through which a mandrel 42 can project to be received in the longitudinal bore 76 of the mandrel driver 75. The tubular section 78 of the body driver 80 is arranged to be acted upon by the variable-influence brake system 58, as explained below.

A first transmission 84 of the fourth embodiment, which is configured to transfer rotary motion of the motor to the mandrel driver when engaged, comprises the pulley 4 (and the pulley attached to the motor and the connecting drive belt, neither of which is visible). Presuming no slip in the drive belt (and no slip of the pulley attached to the motor), since the pulley 4 is rotationally fixed to the mandrel driver 75 the first transmission 84 is permanently fully engaged.

A second transmission 85 of the fourth embodiment, which is configured to transfer rotary motion of the motor to the body driver when engaged, comprises the pulley 4 (and the pulley attached to the motor and the connecting drive belt), mandrel driver 75 and a variable-influence clutch 88. The degree of engagement of the second transmission can be selectively varied, as outlined below.

A transmission control apparatus of the fourth embodiment comprises the variable-influence brake 58 and the variable-influence clutch 88. In this embodiment the first transmission 84 is always fully engaged, as stated above. The transmission control apparatus is therefore arranged to selectively vary the degree of engagement of the second transmission 85 only.

The variable-influence brake system 58 is arranged to act on the tubular section 78 of the body driver 80 to restrict the rotation of the body driver. This may be necessary in order to prevent the mandrel 42 of a rivet 70 directly driving the body 47 of the rivet when relative rotation between the mandrel and the body is required in order to upset the rivet. It may also be necessary to prevent body driver 80 continuing to rotate due to inertia after the second transmission 85 is disengaged. As the structure and function of the variable-influence brake system has been described in relation to other embodiments, it will not be discussed in any further detail here.

The variable-influence clutch 88 comprises a clutch engagement block 89, which is a substantially annular component rotationally fixed to the mandrel driver 75 so that rotation of the mandrel driver causes the clutch engagement block 89 to rotate. A friction plate 90 is attached to the clutch engagement block 89 by pins 91 which permit axial movement of the friction plate 90 relative to the clutch engagement block but prevent any substantial relative rotation between the friction plate and the clutch engagement block. The friction plate 90 has a friction surface 93 which faces an opposing friction surface 94 on the body driver 80 (which is axially fixed). A clutch spring 95 biases the friction plate 90 towards the clutch engagement block 89 to keep the friction surfaces 93, 94 apart. An electromagnet 96 can be selectively energised to attract the friction plate 90, against the bias of the clutch spring 95, to bring the friction surfaces 93, 94 into contact and engage the clutch 19.

Engaging the clutch 88 engages the second transmission 85 by rotationally coupling the clutch engagement block 89 to the body driver 80 through the friction plate 90. The clutch engagement block 89 is rotationally coupled to the mandrel driver 75, which is driven by the motor, therefore engaging the clutch 88 rotationally couples the body driver 80 to the motor. By controlling the degree of energisation of the electromagnet 96, the attractive force from the magnet 96 can be selectively varied in order to control the amount of slip that is permitted between the friction surfaces 93, 94 of the clutch 88, and thus control the degree of engagement of the first transmission 84. The amount of slip permitted by the clutch 88, and thus the degree of engagement of the first transmission 84 (presuming the brake is fully released), can be varied from no slip at all being permitted to slip being completely unrestricted, or anywhere in between. When the first transmission 84 is fully engaged the body driver 80 is urged to rotate in unison with the mandrel driver, and when the first transmission is fully disengaged the body driver may not rotate at all. When the first transmission 84 is partially engaged the body driver 80 is urged to rotate but it may rotate at a slower speed than the mandrel driver 75 (or may not rotate at all, depending on the resistance to rotation of the body driver).

A method of the fourth embodiment of the invention will now be described. This method utilises the above apparatus, and corresponding reference numerals will be used, however it is to be understood that other embodiments may use equipment which falls outside the scope of the fourth embodiment.

As stated previously, the transmission control apparatus selectively adjusts the degree of engagement of the second transmission 85 through the variable-influence brake system 58 and variable-influence clutch 88, but does not adjust the degree of engagement of the first transmission 84. The transmission control apparatus is able to adjust the degree of engagement of the second transmission 85 to any degree of engagement between fully disengaged and fully engaged.

To load a self-upsetting rivet 70, the mandrel 42 of the rivet is inserted through the hole 82 in the body driver 80 and into the longitudinal bore 76 in the mandrel driver. The mandrel 42 pushes any mandrel portions 67 from previously driven rivets along the longitudinal bore 76 and towards the collection bin (not visible). With the rivet 70 inserted, the complementary drive engagement profiles of the mandrel 42 and the longitudinal bore 76 bring the mandrel driver 75 and mandrel into rotational engagement. Similarly, the complementary drive engagement features of the body driver 80 and the head 46 of the rivet 70 bring the body driver and the body 47 of the rivet into rotational engagement. In other words, the mandrel 42 of the rivet 70 and the mandrel driver 75 are rotationally coupled, as are the body 47 of the rivet and the body driver 80. The rivet 70 is held in place by the retention mechanism (not visible) in the distal end of the mandrel driver and the robotic arm or a separate actuator advances the nose 2 of the apparatus with the attached rivet 70 towards a workpiece (not shown) until the bulb 49 of the rivet touches the workpiece Once the self-upsetting blind rivet 70 is in contact with the workpiece, the variable-influence brake system 58 is released so the brake does not restrict the rotation of the body driver, and the electromagnet 96 of the clutch 88 is fully energised. This forces the friction surfaces 93, 94 together with full force to eliminate slip in the clutch and fully engage the second transmission. With the second transmission 85 (and the first transmission 84) fully engaged, the motor is energised. This causes the mandrel driver 75 and body driver 80, and therefore the mandrel 42 and body 47 of the rivet 70, to rotate in unison. The heat generated by the sliding friction between the rivet 70 and the workpiece softens the workpiece in the locality of the rivet.

As the rivet 70 continues to rotate, the robotic arm or a separate actuator advances the apparatus further, driving the rivet through the workpiece until the head 46 of the rivet contacts the surface of the workpiece.

When the head 46 of the rivet 70 contacts the surface of the workpiece, the electromagnet 96 ceases to be energised. The clutch spring 95 is then able to separate the friction surfaces 93, 94 to disengage the clutch and therefore fully disengage the second transmission 84. Simultaneously, the brake 58 is applied to decelerate the rotation of the body driver 80, bringing it to a halt and preventing any further rotation.

With the body driver 80 (and therefore the body 47 of the rivet 70) held stationary, the mandrel driver 75 (and therefore the mandrel 42) continues to be rotated by the motor. This relative rotation of the mandrel 42 relative to the body 47 causes the threaded interface 71 to force the mandrel axially upwards (when viewed from the perspective of FIG. 9). This moves the bulb 49 towards the head 46 of the rivet 70, deforming the body 47 and upsetting the rivet.

As the rivet is upset the torsional resistance applied by the body to the mandrel increases. As the mandrel 42 continues to rotate after the rivet 70 has been upset, the torque applied within the mandrel causes it to fracture and allows the portion of the mandrel furthest from the bulb 49 to be removed to complete the riveting process. The apparatus is then moved away from the workpiece by the robotic arm or the separate actuator so that another self-upsetting blind rivet 70 can be loaded.

The above embodiments have been described in relation to a robot arm or a separate actuator being used to advance the apparatus so as to drive a rivet into a workpiece. However, the invention may instead utilise a third transmission which translates rotary motion of the motor into linear motion of at least the part of the tool which supports the body of the rivet during driving (this part being referred to herebelow as the nose tip). By translating rotary motion of the motor into linear motion of the nose tip, the motor can be used to drive the rivet, as well as rotating it and retracting the mandrel to upset it.

Figure 10:
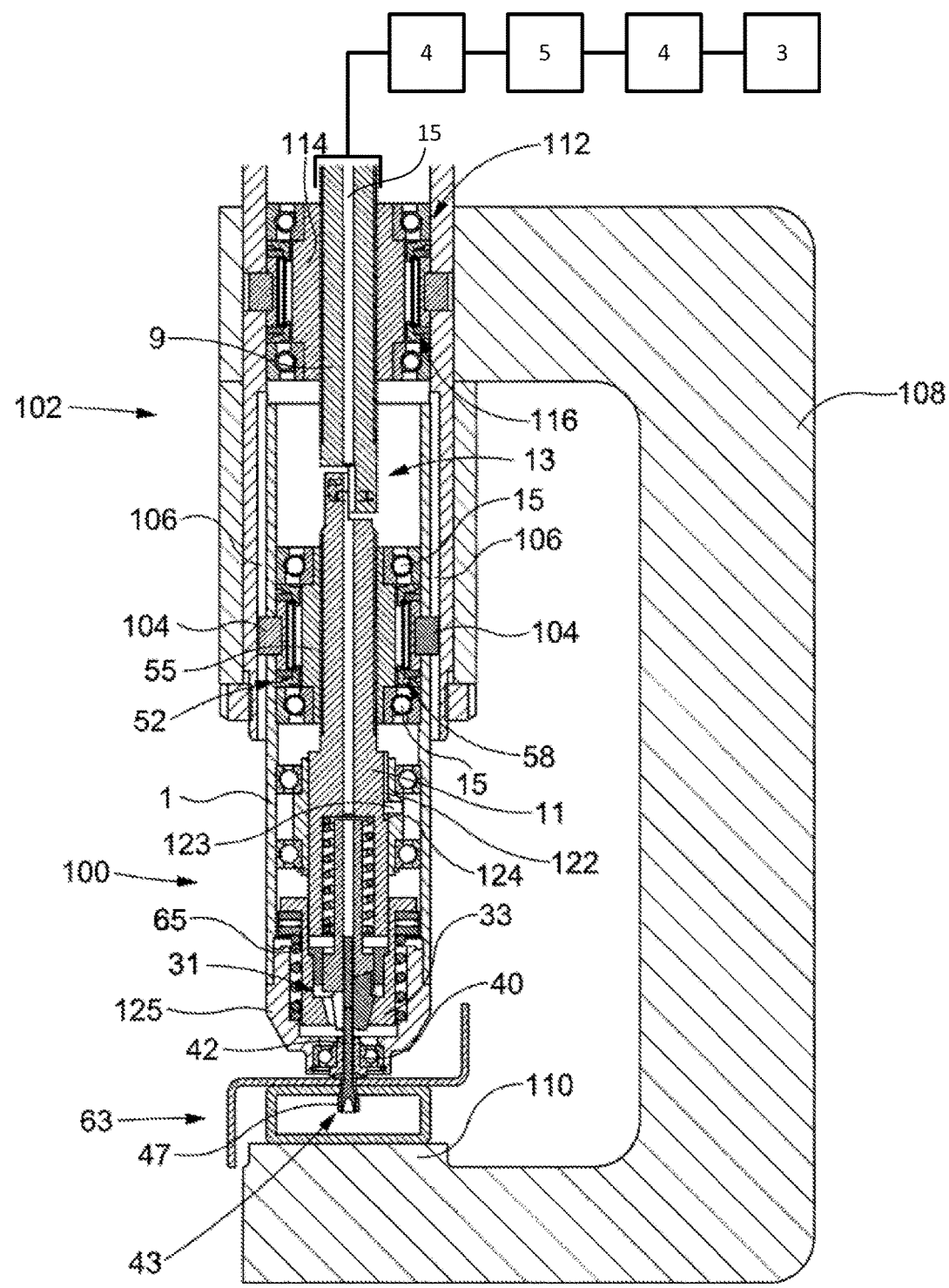
FIG. 10 is a cutaway side view of the apparatus of a fifth embodiment of the invention.

FIG. 10 shows a fifth embodiment of the invention, which utilises a third transmission. It will be apparent that the structure of the fifth embodiment is a modification of the second embodiment, therefore only the differences will be described in detail.

The components of the second embodiment shown in FIG. 6 form a movable portion 100 of the sixth embodiment. The movable portion is axially movable relative to a fixed portion 102. In this embodiment the movable portion 100 is slidably received within fixed portion 102. The movable portion 100 has keys 104 received within keyways 106 in the fixed portion 102, which prevents relative rotation of the movable and fixed portions but allowing axial relative motion. The fixed portion 102 is mounted to one end of a force reaction frame in the form of a C-frame 108, the other end of which has a platform 110 for supporting a workpiece 63.

The movable portion 100 is movable relative to the fixed portion 102 towards the platform 110 through the third transmission 112, therefore a blind rivet 43 mounted to the nose tip (which in this embodiment is the nose piece 40) can be selectively driven towards and into a workpiece 63 on the platform by the transmission control apparatus engaging the third transmission 112 as outlined below.

The third transmission 112 comprises the drive shaft 9 (which unlike the second embodiment is threaded), a driving nut 114 and the non-restraining coupling 13. The transmission control apparatus further comprises (as well as those components discussed in relation to the second embodiment) a driving brake 116. In this embodiment the driving brake is a variable-influence brake (as defined above), and indeed is substantially identical to the variable-influence brake system 58 therefore will not be described in detail.

The third transmission 112 functions in the same fashion as the second transmission 52. The driving nut 114 and drive shaft 9 are threadedly engaged with each other to form a lead screw mechanism, whereby rotation of the drive shaft relative to the driving nut causes the drive shaft to move axially (without slowing its rotational speed). Similarly, the driving brake 116 functions in the same way as the variable-influence brake system 58. To fully engage the third transmission 112, the driving brake 116 is applied so as to prevent slip (i.e. rotation) of the driving nut 114 so as to maximise the relative rotation of the drive shaft 9 within the driving nut and thus maximise the linear motion of the shaft. To fully disengage the third transmission 112 the driving brake 116 is fully released, allowing the driving nut 114 to rotate along with the drive shaft 9 such that there is no relative rotation (and thus no linear movement) of the drive shaft.

Figure 11:
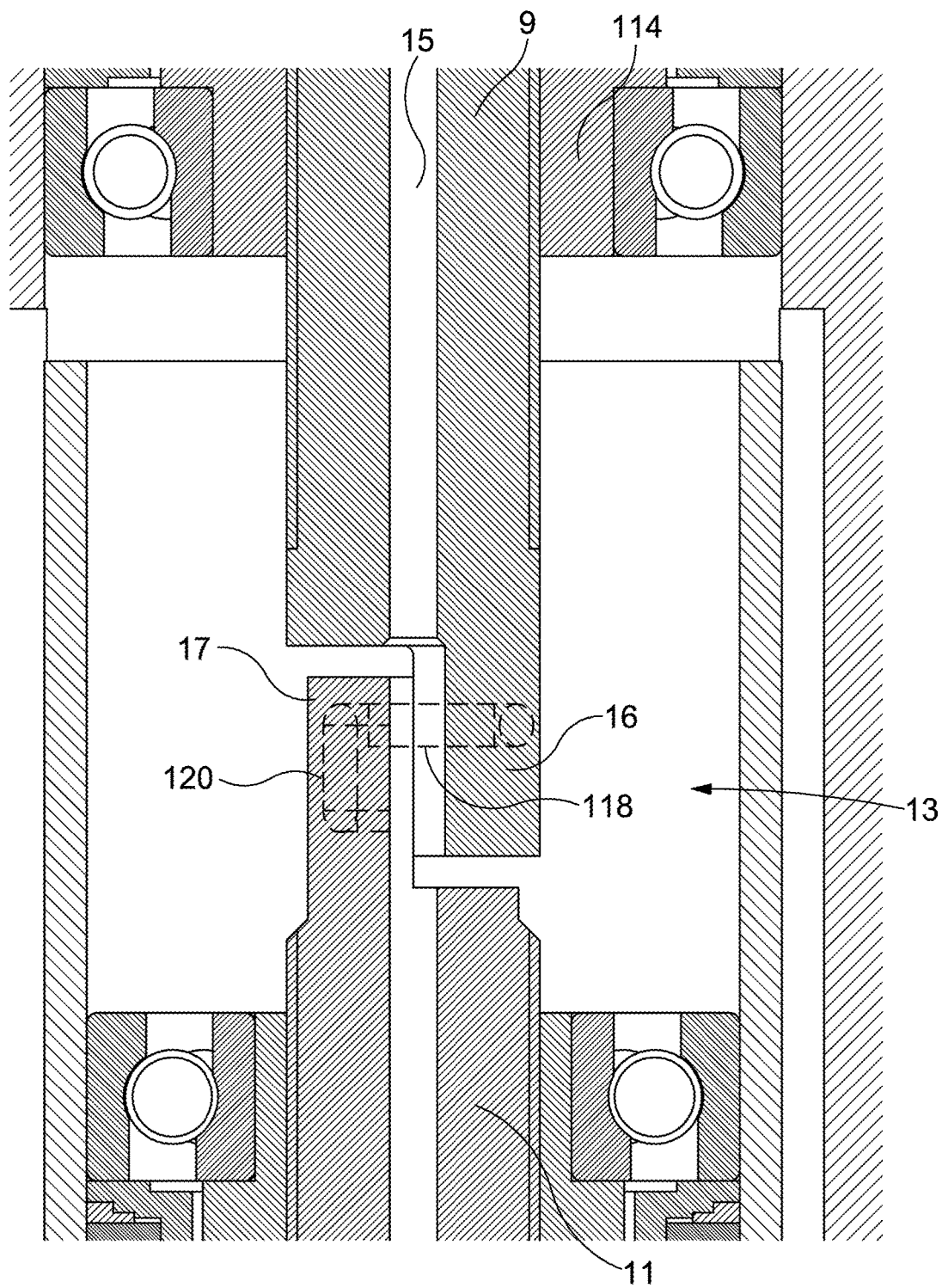
FIG. 11 is a cutaway side view of a non-restraining coupling of the fifth embodiment.

As shown in more detail in FIG. 11, the non-restraining coupling 13 has been modified to include a pair of pins 118 (only one of which is visible, in ghost outline) in the axial portion 16 of the coupling that is part of the drive shaft 9. The pins 118 are positioned on either side of the central bore 15 so as not to obstruct it. Each pin 118 is slidably received within a corresponding slot 120 (again only one of which is visible, in ghost outline) in the axial portion 17 of the coupling 13 that is part of the distal shaft 11. The limited range of motion of the pins 118 in the slots 120 limits the axial freedom of non-restraining coupling 13, thereby limiting the freedom of movement of the distal shaft 11 relative to the drive shaft 9.

Returning to FIG. 10, in the fifth embodiment the housing 1 has a distal end section 125, and the distal shaft 11 has a keyway 122 which terminates in a shoulder 124. The keyway 122 slidably receives a key 123 which is axially fixed relative to the movable portion 100 but rotatable within it. In addition, for the avoidance of doubt, the drive shaft 9 is mounted to the motor by a coupling which allows the motor to continue to rotate the drive shaft as it moves axially. In an alternative arrangement, the motor may be mounted so that it is axially movable along with the drive shaft 9.

A method of blind riveting using the apparatus of the fifth embodiment will now be described, with reference to FIGS. 10 and 11. To begin blind riveting, a blind rivet 43 is placed in the tool so that its body 47 is supported by the nose piece 40 (as described previously), and a workpiece 63 is placed on the platform 110. This is done with the movable portion 100 retracted (i.e. axially distal from the platform 110). At this point, the non-restraining coupling 13 is at its maximum extension, that is to say that the distal shaft 11 is as far away from the drive shaft 9 as the pins 118 will allow.

To advance the movable portion 100 towards the platform 110, thereby advancing the rivet 43 towards the workpiece 63, the variable-influence brake system 58 is released to fully disengage the second transmission 52 (so that the distal shaft 11 cannot move axially within the movable portion 100). The driving brake 116 is then applied to fully engage the third transmission 112, and the motor is energised to rotate the drive shaft 9 in the first direction (as described above). With the driving nut 114 held stationary by the driving brake 116, the drive shaft 9 rotates within the driving nut and therefore moves towards the platform.

Though the drive shaft 9 also drives the distal shaft 11 to rotate through the non-restraining coupling 13, as the second transmission 52 is fully disengaged no axial movement of the distal shaft results. At the start of the axial travel of the drive shaft 9, therefore, the movable portion 100 remains stationary and the drive shaft moves closer to the distal shaft 11. The pins 118 move in their slots 120 to accommodate this relative motion. When the pins 118 reach the ends of the slots 120, the drive shaft 9 can move no closer to the distal shaft 11. Therefore, as the drive shaft 9 continues its axial movement, it forces the distal shaft 11 (and thus the movable portion 100) to move axially along with it. The blind rivet 43 is therefore advanced towards the workpiece 63.

During the above movement, in the event that the second transmission 52 is partially engaged (for instance if friction in the bearings 15 through which the nut 55 is mounted to the casing 1 is sufficient to restrict rotation of the nut so that the distal shaft 11 rotates within it), the distal shaft 11 may move towards the workpiece 63 within the movable portion 100. However, any such movement would be limited by the buffer spring 65 and/or by the clamp block 33 contacting the distal end section 125 of the housing 1. The movable section 100 would therefore ultimately move along with the distal shaft 11 as desired.

When the drive shaft 9 (and therefore the movable portion 100 and rivet 43) has moved to the point at which the rivet touches the workpiece 63, the third transmission 112 is disengaged by releasing the driving brake 116. The drive shaft 9 therefore rotates without moving axially, and the distal shaft 11 (and therefore the clamp 31, nose piece 40 and rivet 43) rotates similarly. The blind rivet 43 rotating on the surface of the workpiece 63 causes friction stir softening of the workpiece as described above.

To drive the blind rivet 43 into the softened workpiece 63, the third transmission 112 is re-engaged. The drive shaft 9 and movable portion 100 are therefore moved axially towards the platform 110, and the blind rivet 43 is driven into the workpiece 63. The motor is then stopped.

To retract the clamp 31 to pull on the mandrel 42 and upset the blind rivet 43, the motor is energised so that it rotates the drive shaft 9 in the second direction (as defined previously) with the third transmission 112 still engaged and the second transmission 52 remaining disengaged. The drive shaft 9 therefore moves axially away from the distal shaft 11, and the non-restraining coupling 13 extends again to permit this relative movement. While the motor continues to rotate the drive shaft 9 in the second direction, the third transmission 112 is disengaged and the second transmission 52 is engaged. This causes the distal shaft 11 (and therefore the clamp 31) to move axially within the movable portion, away from the platform 110 and towards the (axially stationary) drive shaft. As described previously, as the distal shaft 11 moves rearwards within the casing 1, the clamp grips the mandrel 42 of the blind rivet 43. With the clamp 31 and therefore the mandrel 42 of the blind rivet 43 moving away from the workpiece 63, with the body 47 of the rivet held axially stationary against the workpiece by the nose piece 40, the rivet is upset as described previously.

After the rivet has been upset, to retract the tool the second transmission 52 is disengaged and the third transmission 112 is engaged, while the motor continues to rotate the drive shaft 9 in the second direction. The drive shaft 9 therefore moves upwards (from the perspective of FIGS. 10 and 11) away from the distal shaft 11 and extends the non-restraining coupling 13 again. When the non-restraining coupling has reached its full extension (limited by the travel of the pins 118 in the slots 120), the distal shaft 11 is pulled upwards as well. As the second transmission 52 is disengaged, the movement of the distal shaft 11 away from the workpiece retracts the entire movable section 100. When the movable section has been fully retracted, another rivet 43 can be placed into the tool and another workpiece 63 can be placed on the platform 110, and the above process can be repeated.

During retraction of the movable portion 100, in the event that the second transmission is partially engaged (for instance through friction in the bearings 15 as outlined above), the distal shaft 11 may move away from the workpiece 63 within the movable portion 100. However, any such movement would be limited by the shoulder 124 of the keyway 122 in the distal shaft 11 abutting the key 123. The movable section 100 would therefore ultimately move along with the distal shaft 11 as desired.

Figure 12:
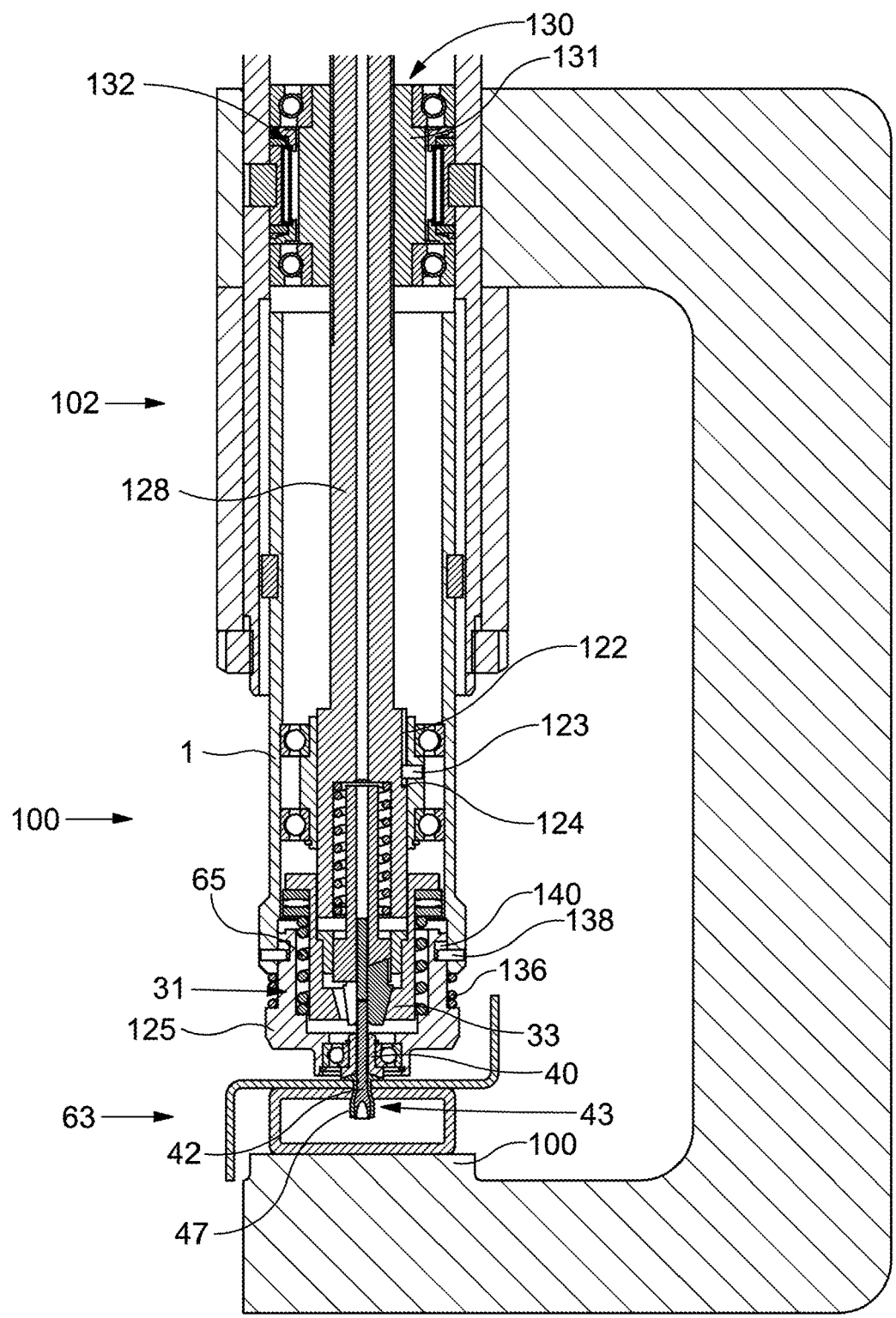
FIG. 12 is a cutaway side view of the apparatus of a sixth embodiment of the invention.

FIG. 12 shows the apparatus of a sixth embodiment of the invention. This apparatus of the sixth embodiment is similar to that of the fifth embodiment, therefore only the differences will be described here.

In the apparatus of the sixth embodiment, the non-restraining coupling has been eliminated and the drive shaft and distal shaft form a single shaft, combined shaft 128, which serves the functions of both separate shafts. In addition, in the sixth embodiment the second transmission and third transmission are the same entity, which takes the form of combined transmission 130. In other embodiments, the third transmission may comprise the second transmission but also additional features which are not part of the second transmission (such as linkages to transmit motion to the nose tip).

The combined transmission 130 comprises the combined shaft 128 and a combined nut 131, and is controlled by a combined brake 132. The combined brake 132 replaces the variable-influence brake system and the driving brake of the fifth embodiment, and forms the transmission control apparatus of this embodiment.

In the sixth embodiment, the distal end section 125 of the casing 1 is movable, in this case slidably, relative to the casing. The distal end section 125 and the casing 1 are urged apart by a resilient member in the form of a coil spring 136, and also by the buffer spring 65. The movement of the distal end section 125 relative to the casing 1 is limited by a pin 138 projecting from the casing and received within a longitudinal slot 140 in the distal end section.

A method of blind riveting using the apparatus of the sixth embodiment will now be described with reference to FIG. 12. To begin blind riveting, with the movable portion 110 retracted, a blind rivet 43 is placed in the tool so that its body 47 is supported by the nose piece 40 (as described previously), and a workpiece 63 is placed on the platform 110.

To advance the movable portion 100 towards the platform 110, thereby advancing the rivet 43 towards the workpiece 63, the combined brake 132 is applied to fully engage the combined transmission 130. The motor is energised to rotate the combined shaft 128 in the first direction. With the combined nut 131 held stationary by the combined brake 132, the combined shaft 128 rotates within the combined nut and therefore moves towards the platform. The combined shaft 128 is prevented from moving downwards (from the perspective of FIG. 12) within the casing 1 beyond a certain point by the restorative force from the buffer spring 65 and/or by the clamp block 33 contacting the distal end portion 125. The movable portion 100 therefore moves towards the platform 110.

When the movable portion 100 (and therefore the nose piece 40 and blind rivet 43) has moved to the point at which the rivet touches the workpiece 63, the combined transmission 130 is disengaged by releasing the combined brake 132. The rivet 43 therefore rotates on the surface of the workpiece 63 and brings about friction stir softening.

To drive the blind rivet 43 into the softened workpiece 63, the combined transmission 130 is re-engaged. The combined shaft 128 and movable portion 100 are therefore moved axially towards the platform 110, and the blind rivet 43 is driven into the workpiece 63.

Unlike in the method of riveting using the fifth embodiment, when using the sixth embodiment once the rivet 43 has been fully driven into the workpiece 63 the motor continues to rotate the combined shaft 128 with the combined transmission 130 engaged. This forces the movable portion 100 against the workpiece 63, which in turn forces the distal end portion 125 towards the casing 1 against the bias of the springs 65, 136. Once the distal end portion cannot travel any further towards the casing 1 (due to the pin 138 reaching the end of the slot 140), the motor is then stopped.

To retract the clamp 31 to pull on the mandrel 42 and upset the blind rivet 43, the motor is energised so that it rotates the combined shaft 128 in the second direction with the combined transmission 130 still engaged. The combined shaft 128 therefore moves axially away from the workpiece 63. Due to the action of the springs 65, 132 and/or due to the shoulder 124 of the keyway 122 contacting the key 123, as the combined shaft moves upwards the movable portion 100 moves with it. However, as the movable portion 100 moves upwards (from the perspective of FIG. 12), the distal end portion 125 (and thus the body 47 of the rivet 43) remains held against the surface of the workpiece under action of the springs 65, 136. As the combined shaft 128 (and therefore the clamp 31 and the mandrel 42 of the blind rivet 43) move away from the workpiece while the body 47 of the rivet is held stationary by the nose piece 40, the rivet is upset.

Once the rivet has been upset, as the movable portion 100 continues to move upwards (from the perspective of FIG. 12), the distal end portion 125 reaches the end of its travel away from the casing 1, and begins to move upwards as well. The tool is therefore retracted and can be reloaded to repeat the above cycle.

Although the above embodiments describe use of a third transmission in an apparatus which is configured to pull axially on the mandrel of a blind rivet, an apparatus configured to rotate the mandrel of a self-upsetting blind rivet relative to its body may also utilise a third transmission. In such an apparatus the third transmission would be connected to at least the body driver (and preferably the mandrel driver as well). The third transmission (under control of the transmission control apparatus) would therefore drive the body driver linearly so as to drive the rivet into a workpiece, Relative rotation between the mandrel driver and body driver would then be used to upset the rivet as described above.

In some situations, it may be desirable to adapt an apparatus which has a third transmission comprising first and second threaded members such that frictional resistance within the threads of the third transmission rotationally couples the first and second threaded members and thereby reduces the degree of engagement of the third transmission. By way of an example, such an apparatus may correspond to that of the fifth embodiment, with (referring to FIG. 10) the threads of the driving nut 114 and drive shaft 9 being configured to provide this frictional rotational coupling. In one example of the use of such an apparatus, to advance the drive shaft (and therefore the nose piece 40 and the rivet 43) towards the workpiece, the driving brake 116 is applied to engage the third transmission 112. The drive shaft 9 therefore rotates and advances the blind rivet 43 towards the workpiece 63. When the blind rivet 43 touches the workpiece 63, the axial loading between the threads of the third transmission 112 is increased dramatically. The increase in axial loading leads to a dramatic increase in friction in the threads of the third transmission. This increase in friction partially overrides the effect of the driving brake 116 and causes the driving nut 114 to rotate, which partially disengages the third transmission 112 and causes the axial movement of the driveshaft 9 (and thus the blind rivet 43) to slow. The driving brake 116 is then released entirely (fully disengaging the third transmission 112) so that the blind rivet 43 rotates on the surface of the workpiece 63 until the workpiece has softened sufficiently. At this point, the driving brake 116 is reapplied lightly (i.e. the brake permits a degree of slip but partially engages the third transmission 112) and the blind rivet 43 is driven into the workpiece 63 as it rotates.

Where rotational coupling between the first and second threaded members of the third transmission of an apparatus is brought about by friction in the threads of the third transmission, such as in the above example, the driving brake 116 may be pre-set to an intermediate degree of engagement throughout insertion of the blind rivet 43 (this is an example of selective adjustment of the degree of engagement of the third transmission). This can allow the degree of softening undergone by the region of the workpiece 63 being penetrated by the rivet to determine the speed of rivet insertion. As stated previously, increased axial loading in the threads of the third transmission 112 causes more friction in the threads and decreases the degree of engagement of the third transmission (i.e. decreases the axial speed of the drive shaft 9 and thus the blind rivet 43). When the blind rivet 43 first contacts the workpiece 63, the axial resistance from the workpiece is high, so the rivet experiences largely rotational motion with little or no linear motion (the effect of the driving brake 116 being largely or entirely overridden by the rotational coupling through the threads, and any unintentional linear motion being counteracted by the buffer spring 65). The blind rivet 43 therefore rotates at the surface of the workpiece 63 and heats the material. When the material at the surface of the workpiece 63 softens due to frictional heating, the axial resistance offered by the workpiece decreases and thus the friction in the threads of the third transmission 112 decreases similarly. The linear motion of the blind rivet 43 therefore increases (due to the effect of the driving brake 116 no longer being overridden), and the rivet is driven into the workpiece 63. As the blind rivet 43 penetrates further into the workpiece 63 it may contact cooler and harder material, at which point the axial loading would increase and the rivet would slow down axially until that material had also been adequately softened. In other words, the degree of engagement of the third transmission 112 fluctuates in response to changes in the forces exerted on the rivet 43 by the workpiece 63 due to resistance to deformation of the workpiece. Such fluctuations may, however, be subject to additional control. For instance, in the case of the workpiece comprising a layer of carbon fibre composite, it may be preferable to restrain the axial motion of the rivet until the workpiece has fully softened, so as to prevent the rivet rotating on the surface of the layer (while the workpiece softens) and fraying the carbon fibre threads.

It should be noted that in any arrangement which utilises axial resistance offered by the workpiece to rotationally couple the first and second threaded members of the third transmission through friction between their threads, the degree of engagement of the third transmission may also be affected by the properties of the blind rivet and the workpiece. With the blind rivet in contact with the workpiece, resistance to rotary motion may be produced in addition to resistance to linear motion (which is what produces axial loading in the threads). In order for the axial loading in the threads to cause the rivet to rotate more quickly, the additional rotational force applied to the blind rivet due to the increased axial loading cannot be fully counteracted by the resistance to rotary motion offered by the rivet and workpiece. The resistance to axial and rotational motion offered by the rivet and workpiece depends on their materials and geometry (as well as their temperature).

In an apparatus which utilises rotational coupling through the threads of the third transmission, it may be desirable to introduce additional friction within the threads so as to ensure that sufficient rotational coupling can occur, or to modify the apparatus so that friction in the threads is maintained at an acceptable level in the event of wear during use. For instance, the threads of the third transmission may be pre-loaded (that is to say that portions of threadedly engaged components of the third transmission may be configured to transmit force therebetween when the punch is not under load) for this purpose.

Figure 13:
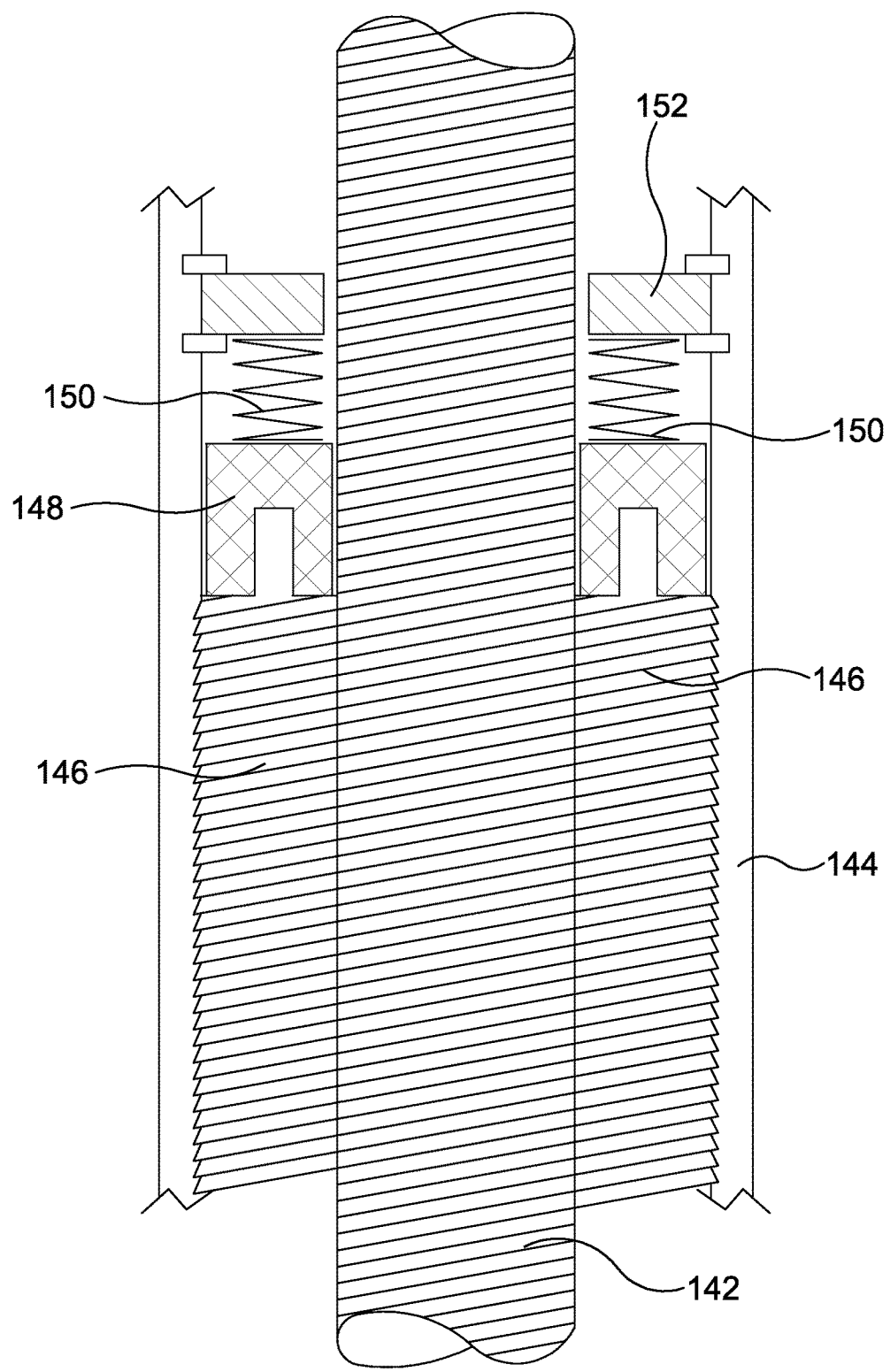
FIG. 13 is a cutaway side view of a roller screw mechanism suitable for use with the invention.

FIG. 13 shows a cross-section through part of a roller screw mechanism that includes pre-loaded threads. More specifically, the rollers are biased relative to the roller nut tube as outlined below. As with a conventional roller screw mechanism, this arrangement has a roller screw 142 concentrically received within a roller nut tube 144, with a circumferential array of threaded rollers 146 positioned between them and threadedly engaged with both. The threaded rollers 146 are held relative to one another by cages 148 (only one of which is visible) at their axial extremities. Such a mechanism may be utilised, in place of the lead screw mechanisms described above, as a third transmission within an apparatus according to the invention. For instance, the motor may be connected to the roller nut tube 144 and the nose piece may be connected to the roller screw 142. As such, relative rotation between the roller screw 142 and roller nut tube 144 would produce linear movement of the nose tip (i.e. the third transmission would be engaged), and fully rotational coupling therebetween would cause the entire roller screw mechanism to rotate together (i.e. the third transmission would be disengaged).

Unlike conventional designs, in which the axial position of the rollers 146 is fixed relative to either the roller screw 142 or the roller nut tube 144, in this arrangement the rollers are biased axially (downwards from the perspective of FIG. 13) relative to both. In this example, the rollers are biased by resilient elements in the form of coil springs 150, held compressed between one of the cages 148 and a retainer ring 152. In this example the rollers are axially fixed relative to the roller nut tube 144 (i.e. the roller screw 142 is axially movable relative to the rollers 146). The retainer ring 152 is therefore axially fixed relative to the roller nut tube 144. In a modification of this arrangement, the mechanism may also have a stop member positioned so as to prevent the rollers from being forced (by external loading) upwards, against the bias of the springs, to the point where the springs may be damaged or become ineffective. For example, each spring may have a rod running through its centre which, if the rollers were driven upwards, would act as a spacer and prevent the springs from being compressed any further. For the avoidance of doubt, the rollers 146 being axially fixed relative to the roller nut tube 144 would not impede the function of the invention, as rotary motion of the roller nut tube (connected to the motor) can still be converted into linear motion and/or rotary motion of the roller screw (connected to the nose tip).

The rollers 146 being biased relative to the roller nut tube 144 increases the force that presses the surfaces of the meshed portions of the threads of these components towards each other. The surfaces of the threads being forced together more strongly acts to increase the frictional resistance therebetween, and thus the frictional resistance in the threaded engagement of the roller screw mechanism as a whole is increased. By coupling a motor to one of the roller screw and roller nut tube, and coupling the nose tip to the other, the tendency of the roller screw mechanism to rotationally couple the motor and roller screw 142 (i.e. decrease the engagement of the third transmission) may be increased.

While the above holds true when there is no external axial force applied to the components of the roller screw mechanism, such external loading can counteract the effect of the springs 150. However, the presence of such loading inherently increases the friction between the threads, thus counteracting the influence of the springs. For instance, if the roller screw 142 was urged upwards (from the perspective of FIG. 13) relative to the roller nut tube 144, the roller screw would lift the rollers 146 upwards against the bias of the springs 150, and the friction in the threaded engagement between the rollers and the roller nut tube would be decreased. However, the friction in the threaded engagement between the roller screw and the rollers would see a corresponding increase. The friction within the roller screw mechanism as a whole would therefore remain at an acceptable level.

Though the above has been described in relation to the nose tip being connected to the roller screw 142 and the motor being connected to the roller nut tube 144, other arrangements may utilise such a mechanism in a different fashion. For instance, the roller screw 142 may be axially stationary and driven to rotate by the motor, and the roller nut tube 144 may be connected to the nose tip and movable axially along the roller screw. Alternatively or in addition, the rollers 146 may be axially fixed relative to the roller screw 142 rather than the roller nut tube 144 (in which case the retaining ring 152 would also be axially fixed relative to the roller screw rather than the roller nut tube). In other words, the roller screw mechanism may work in four different configurations: axially fixed roller nut tube and rollers with axially movable roller screw, axially fixed roller nut tube with axially movable rollers and roller screw, axially movable roller nut tube and rollers with axially fixed roller screw, and axially movable roller nut tube with axially fixed rollers and roller screw. For the avoidance of doubt, other roller screw mechanisms (such as that described below) may also work in any of the above configurations.

Pre-loading of the threads of the third transmission, for instance by utilising the roller screw mechanism of FIG. 13, may also be beneficial in that with the rollers 146 urged axially relative to (in this case) the roller nut tube 144, the effect of wear of these components on the function of the apparatus can be minimised. Indeed, some arrangements may allow the friction in the threads for a given external loading to be maintained at a substantially constant level throughout normal wear of the mechanism. Whilst conventional threads become looser with wear, leading to greater clearance between the surfaces of the threads and consequently less friction between them, the springs 150 act to maintain a tight interface between the meshed threads of the rollers 146 and roller nut tube 144, and therefore maintain sufficient friction therebetween. Pre-loading the threads may also reduce play in the threads, thereby reducing backlash.

Figure 14:
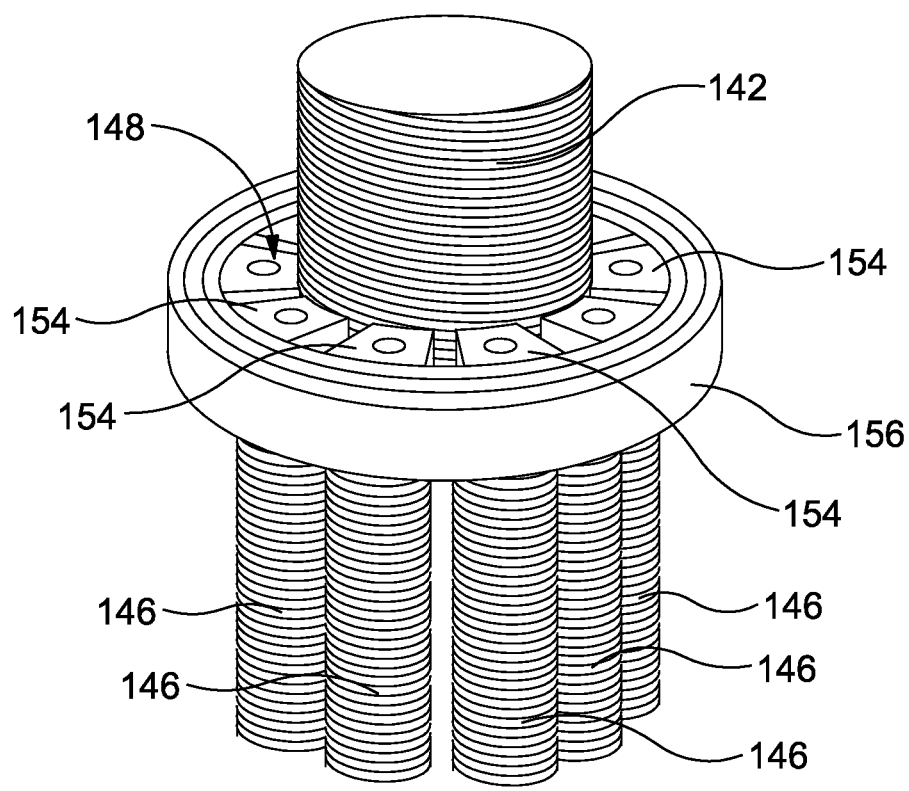
FIG. 14 is a perspective view of another roller screw mechanism suitable for use with the invention.

FIG. 14 shows another arrangement of a pre-loaded roller screw mechanism. Again, the arrangement has a roller screw 142, a roller nut tube (not shown) and an array of rollers 146 held at each axial end in a cage 148 (only one of which is shown). In this case however, each cage 148 is made up of a plurality of segments 154. A spiral spring 156 (sometimes known as a tensator spring) is wrapped around the circumference of each cage 148, and acts to urge the segments 154 of the cages 148, and therefore the rollers 146, radially inwards towards the roller screw 142. The rollers 146 being radially urged against the roller screw 142 increases the friction in the threaded engagement in the same fashion as the arrangement of FIG. 13. Though in the above example each roller has an individual segment 154 of each cage 148, in other arrangements one or more rollers may share a common segment. In other examples, only one of the cages 148 may be segmented. Similarly, though in this example the rollers 146 are biased radially inwards towards the roller screw 142, in other arrangements they may be biased outwards towards the roller nut tube (not shown). This may be beneficial in that in the arrangement of FIG. 14, as the rollers 146 revolve around the roller screw 142 centrifugal force would counteract some or all of the force from the spring 156, whereas if the spring urged the rollers outwards towards the roller nut tube, centrifugal force would compound the effect of the spring.

Due to the space taken up by the springs on the radially outer side of the cages, the mechanism shown in FIG. 14 may be more suited to situations where the rollers are axially fixed relative to the roller nut tube 144. This would avoid the necessity for the rollers to engage with the inside of the roller nut tube, and thus for the springs to fit within the roller nut tube without touching it, since the springs could then be positioned on the axial extremities of the roller nut tube.

Figure 15:
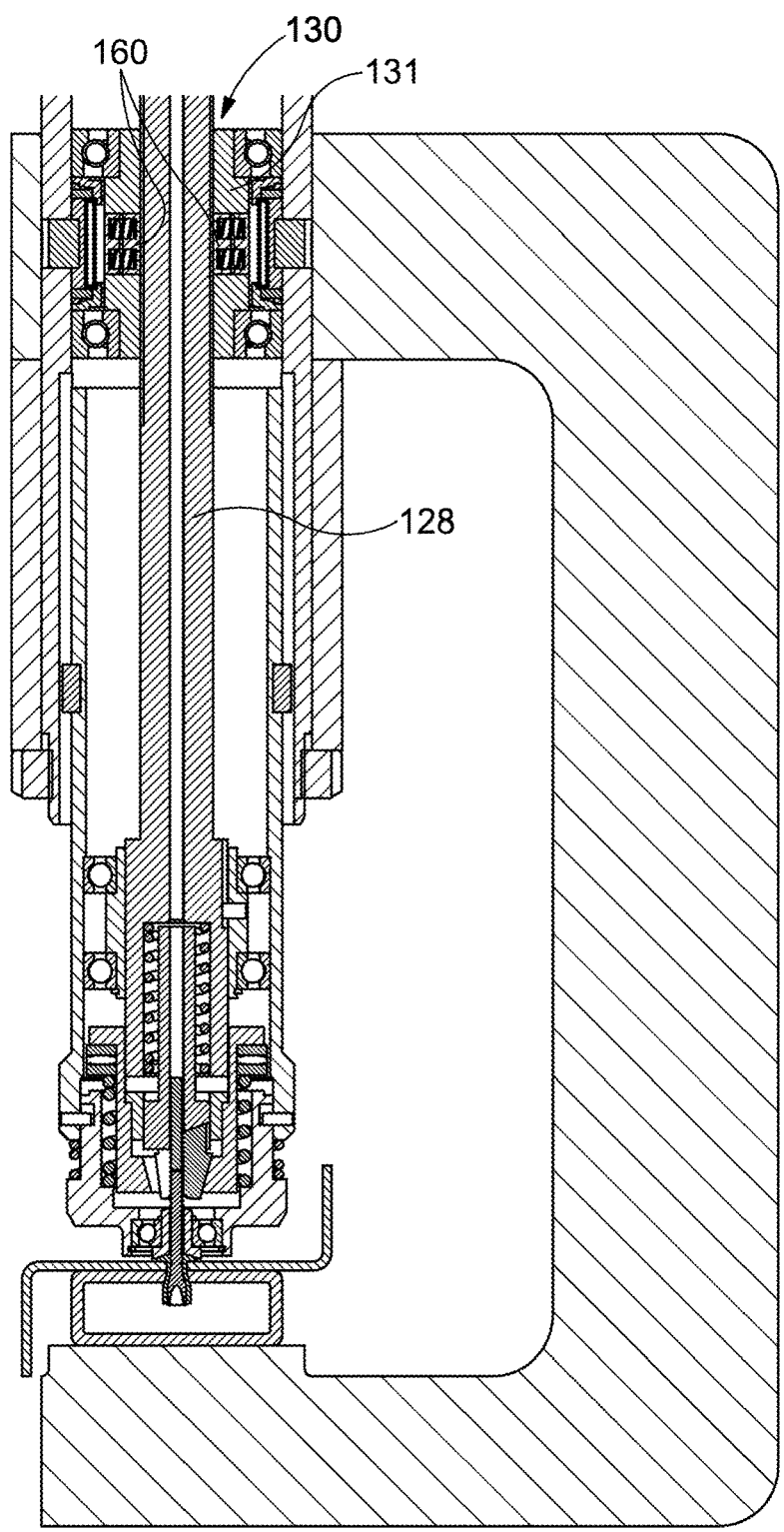
FIG. 15 is a cutaway side view of a modification of the sixth embodiment of the invention.
Figure 16:
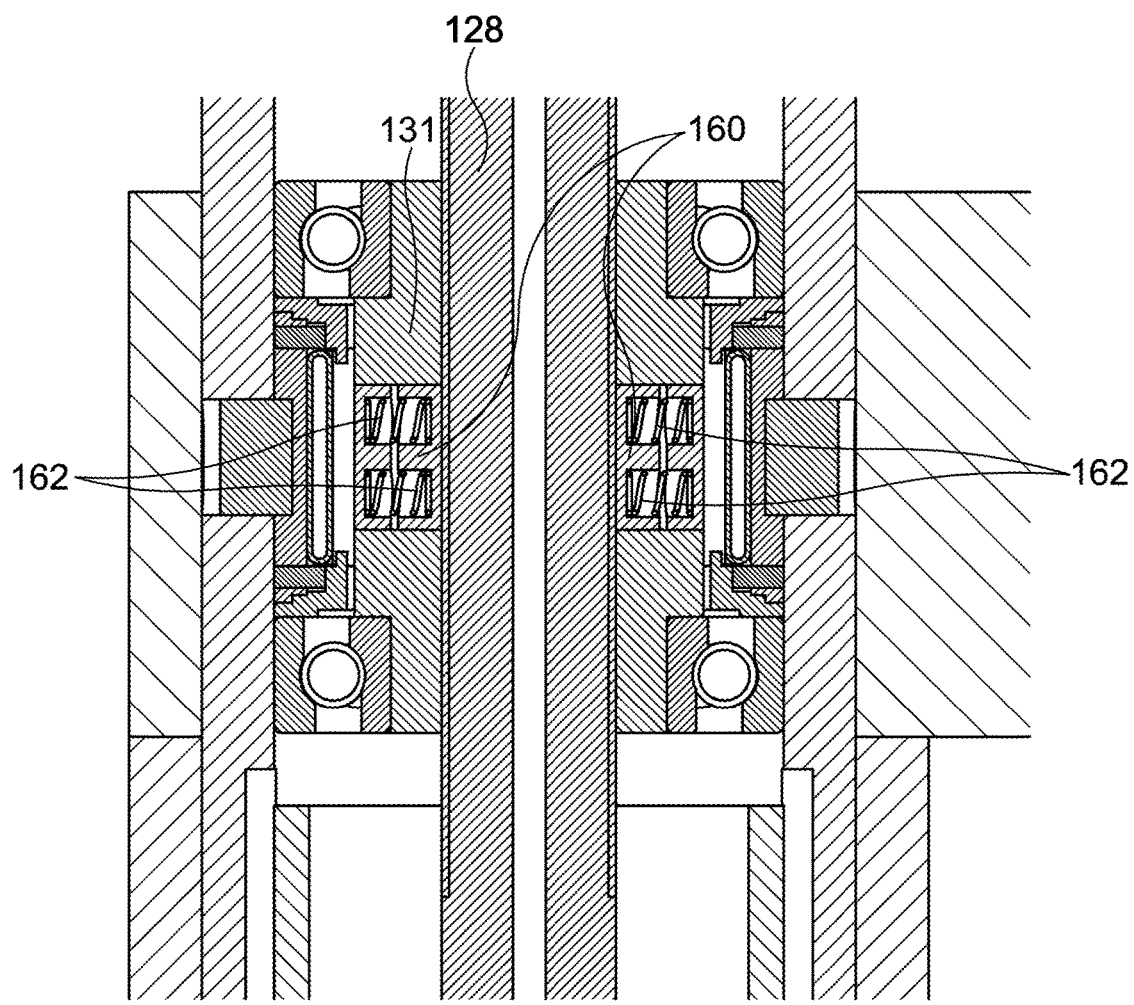
FIG. 16 is a cutaway side view of a portion of the modification of the sixth embodiment.

FIG. 15 shows a modified version of the sixth embodiment of the invention, in which the lead screw mechanism of the combined transmission 130 (which functions as the third transmission as outlined above) has been adapted to introduce pre-loading in its threads. As shown in more detail in FIG. 16, the combined nut 131 has a plurality of pressure pads 160 received in cavities therein. In this embodiment the pressure pads are threaded for engagement with the combined shaft 128 (however in other embodiments they may not be). The pressure pads 160 are urged radially inwards, against the combined shaft 128, by resilient members in the form of coil springs 162. As explained above, with the combined shaft 128 driven to rotate by the motor, by engaging the variable-influence braking system 20 to restrict the rotation of the nut 131, the combined shaft rotates relative to the nut and thus moves axially. If the nut 131 rotates along with the shaft 128, there is no relative rotation and so no axial movement results. The pressure pads 70 being urged against the combined shaft 128 pre-loads the threaded engagement between these components, increasing the friction in the lead screw mechanism and thus increasing the extent to which the nut 131 and shaft 128 tend to rotate together. In an alternative arrangement, the pressure pads may be received in longitudinal slots in the nut, and be urged in an axial direction. In a further alternative arrangement, the pressure pads may be positioned about the outer circumference of the nut and urged radially outwards against the housing within which the nut is rotatable (such as the driving brake in this example).

In a further example of a pre-loaded lead screw mechanism, the nut may be formed from two axially-spaced portions (each of which may take the form of a complete nut) which are urged together or apart. In such an arrangement, when an axial load is applied (i.e. a load which urges the nut and shaft to move relative to each other in an axial direction), the friction between the shaft and one portion of the nut would be decreased, but the friction between the shaft and the other portion would be increased. Indeed, the load may be sufficient to completely counteract the force biasing the two portions apart. In this case, the entire load would be supported by one of the portions. In one alternative arrangement, the threads of the lead screw mechanism may be pre-loaded using two axially-spaced portions are urged to rotate relative to each other. In another alternative arrangement, only a circumferential sector of the nut is formed from two axially-spaced portions. In a further alternative arrangement, the nut is formed from a plurality of circumferentially-spaced portions with gaps therebetween, the circumferentially-spaced portions being urged radially inwards (e.g. by a tensator spring).

The threads of the third transmission may also be pre-loaded externally (that is to say by a component that is not comprised within the third transmission). For instance, referring back to FIG. 10, in the apparatus of the fifth embodiment the resistance to linear motion of the distal shaft 11 that is provided by the buffer spring 65 (as described above) may bring about pre-loading of the third transmission 112. Similarly, referring to FIG. 12, the springs 65 and 136 of the sixth embodiment may pre-load the threads of the combined transmission 130 in a similar fashion. Indeed, in either case the spring or springs may be modified so that the stages during blind riveting at which it/they are deformed and produce a restorative force, and/or the magnitude of the restorative force produced, may be customised according to the requirements for pre-loading. In alternative arrangements, additional resilient members may be positioned elsewhere on the apparatus for the purposes of pre-loading. For instance, referring back to FIG. 10, the fifth embodiment may be modified to include tensile springs stretched between the tops of the keys 104 and the tops of the keyways 106 in the fixed portion 102. Such springs would pre-load the threads of the third transmission 112 by urging the movable section 110 upwards (from the perspective of FIG. 10), thereby urging the drive shaft 9 upwards within the driving nut 114 and increasing the friction in the threaded engagement therebetween.

In another example of pre-loading the threads of a third transmission, frictional resistance, rather than the restorative force of one or more resilient members, may be used to increase the force transmitted through the threads (and therefore the friction between the threaded members). For instance, referring to FIG. 10, the fifth embodiment may be modified so that the keys 104 are radially movable within the casing 1 of the movable portion and urged radially outwards by (for example) compression springs. The keys 104 are therefore pressed against the fixed portion 102, within the keyways 106, increasing the friction between the fixed and movable portions 102, 100. The sprung keys would therefore form a linear brake (that is to say a brake which is configured to resist at least linear motion) which opposes linear movement of the movable portion 100 (and thus the drive shaft 9). This resistance to motion of the drive shaft 9 would increase the loading in the threads of the third transmission 112 whenever the movable portion 100 was moving axially. The lack of pre-loading when the movable portion is stationary would not be detrimental to the function of the apparatus, as (presuming the motor is energised) the movable portion would only be axially stationary when the third transmission 112 was fully disengaged, meaning that no additional rotational coupling is required.

Figure 17:
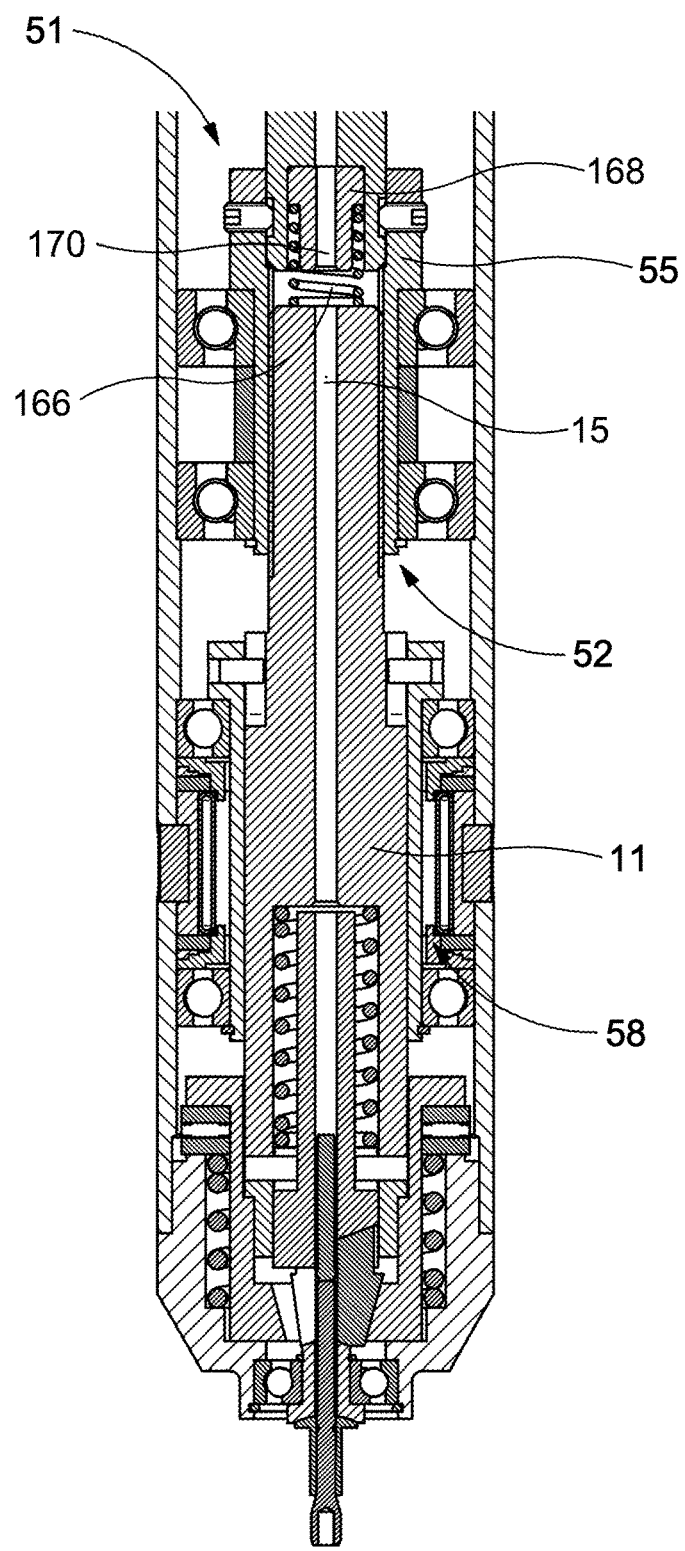
FIG. 17 is a cutaway side view of a modification of the third embodiment of the invention.

As well as or instead of pre-loading the threads of the third transmission, where an apparatus has a second transmission comprising threaded members these may also be modified to pre-load the threads. The rotational coupling therein may also allow the variable-influence brake (and/or clutch) to be pre-set as described above (this being an example of selective adjustment of the degree of engagement of the second transmission). FIG. 17 shows a modification of the third embodiment of the invention where the second transmission 52 has pre-loaded threads. A resilient member in the form of a coil spring 166 is held compressed between opposed end faces of the drive shaft 9 and the distal shaft 11. The spring 166 acts to urge the drive shaft 9 (and therefore the nut 55) and the distal shaft 11 apart, thus pre-loading the threads. Pre-loading the threads in this fashion ensures that when the variable-influence brake system 58 is completely released, there is enough friction between the nut 55 and distal shaft 11 to ensure that they rotate in unison (i.e. the first transmission 51 is fully engaged and the second transmission 52 is fully disengaged). This arrangement also includes an insert 168 with a bore 170 that is aligned with the central bore 15 in the distal shaft. The insert 158 is positioned to minimise the gap in the central bore 15, thereby preventing the mandrels of previously upset rivets from falling out of the bore part way up the tool.

For the avoidance of doubt, the above arrangements are purely exemplary, and internal or external pre-loading of the second or third transmission may be carried out in any other suitable fashion. For instance, a biasing spring and/or linear brake may be positioned in any other suitable location and/or act on any other suitable component of the apparatus. In addition, one or more of the features discussed in relation to pre-loading the threads of the third transmission may be applied in relation to pre-loading of the second transmission, and vice versa.

Numerous modifications to the above described apparatus and methods may be made without departing from the scope of the invention as defined by the appended claims. For example, the apparatus may be mounted on fixed automation, a pedestal or on a counterbalanced beam arranged to allow manual positioning of the apparatus, rather than on a robotic arm.

Though the above arrangements which include a third transmission utilise a force reaction frame while those with no third transmission do not, it is to be understood that a force reaction frame may or may not be utilised in any arrangement according to the invention depending on the circumstances. For instance, use of a force reaction frame may enable less powerful automation to be used, as in this situation it would only be required to lift and move the apparatus, rather than also having to produce sufficient force to drive a rivet into a workpiece (or resist the force of this being done by a third transmission or a separate actuator). However, the added bulk of a force reaction frame may make its use unsuitable in situations where the tool must reach into tight spaces. In addition, a force reaction frame may be unsuitable due to the reverse of a workpiece (i.e. the side opposite that through which the rivet enters) being inaccessible or unable to support the required load. For instance in an aircraft wing, the reverse side of the skin layers portions being riveted may be inaccessible, and/or if the wing were supported on the platform of a force reaction frame the squeezing force during rivet insertion may cause the wing to buckle.

The first transmission of the first, second, third, fifth or sixth embodiments or the second transmission of the fourth embodiment may comprise less than all of the components listed previously, or may comprise other components instead or in addition. This transmission may also take any other suitable form, such as a coaxial or radially offset simple gearbox, an epicyclic gearbox or a harmonic drive. The second transmission of the first, second, third, fifth or sixth embodiments, the first transmission of the fourth embodiment, or the transmission control apparatus of any of the above embodiments may comprise less than all of the components listed previously and/or may comprise other components instead or in addition.

While the second transmission of the first, second, third, fifth and sixth embodiments comprises a lead screw, it may instead comprise a ball screw, a roller screw or any other suitable drive mechanism. As the above described embodiments utilise lead screws, the threads of the first and second threaded members act directly on each other. In other embodiments, however, the threads may act indirectly on each other. For instance, in embodiments which utilise a ball screw or a roller screw the threads of the first and second threaded members act on each other indirectly, through the balls/rollers. For the avoidance of doubt, pre-loading of the threads of a ball screw mechanism may also be performed, for instance by urging the balls axially or radially (e.g. by applying, to the ball raceway of the ball screw, one of the concepts described above in relation to the cage of a roller screw mechanism).

Throughout the discussion of the above apparatus, linear motion of several components relative to the drive shaft has been described. This is not intended to imply any additional functional relationship between those components and the drive shaft. Reference to motion with respect to the drive shaft is merely used to provide a consistent frame of reference in relation to axial movement.

The non-restraining coupling may comprise more than one projection from each shaft. Each projection may be a circular sector, as described above, or may have a different cross sectional shape. In addition, the non-restraining coupling may take other suitable form. For instance, one shaft may have one or more axial projections which are received in complimentarily shaped and spaced bores in the other shaft. The restraining coupling of the first embodiment may also take any other suitable form. For instance, rather than utilising a restraint housing, one shaft may have hooked or barbed protrusions which engage with flanges or grooves on the other shaft to prevent separation of the two shafts.

The restraining coupling of the first embodiment may comprise a variable-influence clutch instead of a one-directional clutch. The variable-influence clutch may be controlled so as to only transmit motion of the intermediate shaft to the distal shaft when the intermediate shaft is rotating forwards.

In the first embodiment, since the intermediate and distal shafts are both in contact with the restraint housing it is possible for the intermediate shaft to cause the restraint housing to rotate, which in turn may cause the distal shaft to rotate. In the first embodiment any such backwards rotation of the distal shaft is prevented by the torsional resistance of the mandrel of the blind rivet in the jaws of the clamp. In other embodiments however, the distal shaft may pass through a second one-directional clutch. Such a clutch may have an opposite configuration to the one-directional clutch and have a rotationally fixed cup. In such an embodiment, when the distal shaft is rotated forwards the rollers of the second one-directional clutch will be rolled down the ramps and allow the shaft to rotate. When the shaft is driven backwards however, the rollers will be rolled up the ramps and jammed between the distal shaft and the rotationally fixed cup. The shaft will therefore be prevented from rotating.

The jaws of the clamp of the first, second, third, fifth or sixth embodiments may have shaped portions such as teeth or textured areas in order to provide a better purchase on the mandrel of a blind rivet. Although in the above embodiments the clamp is opened by the clamp release block, other embodiments may utilise a different mechanism for opening the clamp. For instance, the nose piece may be provided with a clamp opening surface to cam the jaws apart when they are moved into contact with it.

It is to be understood that where the above description refers to a spring, such as the release spring, buffer spring, clutch spring or a spring providing pre-loading of threaded members, this spring may instead be any other type of resilient member. Examples of resilient members include leaf springs, Belleville washers, coil springs, volute springs, tensator springs, gas springs, and elastomeric tubes, rods, sheets and blocks. Alternatively, one or more of the springs (or other types of resilient member) may be replaced with an actuator such as a solenoid or electromagnet. Such an actuator may be arranged to generate a constant force throughout operation of the apparatus, or it may be actively controlled (for example a solenoid may be used in pre-loading, and may be energised only when rotational coupling through the threads is desired).

Some embodiments may load a blind rivet without first actively opening the jaws of the clamp to receive it. For instance, the mandrel of a blind rivet may be forced up against the closed jaws. This would move the jaws towards the drive shaft, releasing them from the clamp closing surface of the clamp block and forcing them against the clamp opening surface of the clamp release block. Maintaining the force on the jaws through the rivet mandrel would cam the jaws apart until the mandrel could slip between them.

The loading of blind rivets onto the nose of a tool may be performed in any suitable fashion. For instance, they may be blown under air pressure from bulk storage along rigid tubes and/or flexible hoses, and/or may be inserted into the nose of the tool by a pick and place machine.

The variable-influence brake system of the described embodiments may comprise a single brake pad rather than a plurality of pads in an array. Also, the brake may take the form of an electromagnetic generator or an electromechanically activated wrapped spring brake, or it may instead comprise a volume of magneto-rheological or electro-rheological fluid retained between a rotationally fixed surface and the rotational component, the resistance to slip of the brake being controlled by the application of a magnetic or electric field to the fluid to vary its viscosity. Alternatively, the variable-influence brake system may take any other suitable form.

The variable-influence clutch of the fourth embodiment (or of any other arrangement) may also utilise a volume of magneto-rheological or electro-rheological fluid. The fluid may be retained in a cavity between a component rotationally coupled to the motor and a component rotationally coupled to the rivet. The resistance to slip of the clutch may be controlled by the application of a magnetic or electric field to the fluid to vary the viscosity of the fluid and therefore the degree of slip permitted by the clutch. Some embodiments may have a variable-influence brake and the variable-influence clutch which each utilise volumes of magneto-rheological or electro-rheological fluid which are axially adjacent to each other. In a variation of the fourth embodiment, for example, the clutch may utilise friction surfaces as described previously, but the friction surfaces of the clutch may be tubular and act around the circumference of the tubular section of the body driver (or alternative component), rather than being planar and acting on the end of the tubular section (or alternative component). Instead or in addition to the above, a variable-influence clutch may utilise electromagnetic resistance. The rotor and armature windings (or equivalent features) of such a clutch may be planar and act on the end of the tubular section (or other component), or may be tubular and act around the circumference of the tubular section (or alternative component).

Where the application refers to 'slip' of a brake or clutch, it is to be understood that in the case of a brake or clutch utilising electromagnetic resistance or magneto-rheological or electro-rheological fluid, the 'slip' of the brake or clutch refers to the degree of relative motion of the relevant components that is permitted.

In alternative embodiments of the second, fourth or fifth aspects of the invention, the rivet may begin to rotate before it contacts the workpiece. This may allow the rivet to reach a required rotational speed before contacting the workpiece, which may speed up the process cycle time. In further alternative embodiments, the rivet may begin to rotate simultaneously with it touching the workpiece.

Although in the described embodiments the second transmission is fully engaged when the blind rivet is to be upset, it may instead only be partially engaged at this point. This would decrease the speed of the clamp or mandrel driver, and thus the speed of upsetting, without requiring the speed of the motor to be adjusted. This may allow simpler and/or cheaper motor control systems to be used.

Although the driving engagement features of the second, third, fourth, fifth and sixth embodiments are radial grooves in the nose piece which engage with complimentary radial ridges in the rivet head, any other suitable interface means may be used. For instance, the head of the rivet may have radial grooves and the nose piece radial ridges, or the nose piece and rivet may interface via a single shaped protrusion and recess (such as a Phillips, hex or torx drive) or via multiple complimentarily shaped and spaced protrusions and recesses. Similarly, the driving engagement between the jaws and the nose piece in the above embodiments, or the driving engagement profiles of the rivet mandrel and the longitudinal bore of the fourth embodiment, may take any of the above forms or may utilise any other suitable interface mechanism.

In order to maintain the engagement of the driving engagement features of the nose piece and the rivet, rather than using a magnet or ball detent the rivet may be held in position by a temporary adhesive. Alternatively or in addition, it may be held in place by mechanical means such as spring biased jaws, or it may be biased towards the nose piece by compressed air blowing it (or a vacuum sucking it) into engagement with the nose piece. The retention mechanism, where present, may also be on a different component of the apparatus such as the nose piece.

The nose piece of the first, second, third, fifth or sixth embodiments may be freely rotatable in either direction, as shown, or may only be rotatable in one direction (for instance it may be connected to a one-directional clutch). The nose piece being rotatable in only one direction may be useful for driving self-upsetting rivets. In one such embodiment, the rivet is driven by its mandrel but the nose piece is rotationally coupled to the rivet body. The mandrel is first rotated in the direction in which the nose piece can rotate, therefore the body and mandrel of the rivet (and the nose piece) can rotate together and the rivet can be driven into a workpiece. By subsequently rotating the mandrel in the direction in which the nose piece cannot rotate, the mandrel is rotated but the rivet body is prevented from doing so by the nose piece. This provides relative rotation between the mandrel and the rivet body which, via the internal thread between them, upsets the rivet.

Although in the third embodiment (for example) the transmission control apparatus comprises a variable-influence brake system, in other embodiments it may instead comprise a one directional clutch with a rotationally fixed cup such as the one discussed in relation to (but not included in) the first embodiment. This clutch would allow the distal shaft to rotate in the first direction to rotate the rivet, but would prevent rotation of the distal shaft in the second direction. Preventing the distal shaft rotating in the second direction would engage the second transmission and create the axial movement needed to pull on the mandrel and upset the rivet.

For the avoidance of doubt, though one type of self-upsetting blind rivet has been described, the third and fourth aspects of the invention are not limited to driving only this type of rivet. Any blind rivet which is upset by relative rotation between the mandrel and the body of the rivet may be suitable.

In alternative embodiments of third, fourth and fifth aspects of the invention, the transmission control apparatus may also selectively adjust the degree of engagement of the first transmission (using a variable-influence clutch or any other suitable arrangement). This would allow a pause in the process profile (discussed below) to be introduced, as may be desirable to allow the workpiece to cool, by disengaging both transmissions. Without the ability to disengage the first transmission as well, a pause in the process profile would require the motor to be brought to a halt before being restarted, which could waste a significant amount of energy and/or place excessive strain on the apparatus.

Alternative embodiments of the third aspect of the invention may not require use of a variable-influence brake system. Instead, the head of the rivet may be pressed into the surface of the workpiece with sufficient force that the friction between the head and the workpiece holds the rivet body stationary while the mandrel continues to rotate. Where this method is to be used, the underside of the rivet head may advantageously be provided with features to increase friction between the head and the workpiece.

In further embodiments of the fourth aspect of the invention, to upset a self-upsetting blind rivet it may be the mandrel which is prevented from rotation while the rivet body continues to rotate.

It should be noted that kinetic energy of the apparatus, rather than torque from the motor, may be used to provide some or all of the rivet rotating force or the upsetting force (i.e. the axial movement of the clamp in the first, second, third, fifth and sixth embodiments or the rotation of the mandrel only in the fourth embodiment). For instance in the first embodiment the drive, intermediate and distal shafts may progressively speed up and gather angular momentum while the apparatus and rivet are advanced linearly towards the workpiece. When the rivet contacts the workpiece and experiences resistance to its movement, the kinetic energy of the spinning shafts can be transferred to the rivet to supplement (or replace) the force from the motor. Use of kinetic energy to provide at least some of the upsetting or rotational force may allow less powerful motors (and gearing, where used) to be employed, which may be cheaper and/or lighter, and/or have a lower power consumption. Embodiments which utilise kinetic energy may make use of a flywheel to store the required kinetic energy.

Alternatively or in addition, torque from the motor may provide some or all of the rotational or upsetting force directly. For instance, if pauses in the process profile (as discussed below) are required, this may necessitate dissipation of the kinetic energy in the apparatus in order to bring the apparatus to a halt, the kinetic energy being built up again after the pause. The dissipation and building up of excess kinetic energy may put strain on the apparatus (requiring it to be more heavily built or serviced more often) or may slow the riveting process down. In some embodiments therefore, it may be preferable to use torque directly transferred from the motor to provide all necessary force and to minimise the kinetic energy that can build up in the apparatus.

The above process, or any other method discussed herein, may be controlled to a further degree through adjustment of the motor characteristics, for instance by varying its speed/torque profile simultaneously or sequentially with the operation of a variable-influence brake and/or variable-influence clutch.

Although specific examples and explanations have been given above, the invention is suitable to be utilised in, or applied to, methods of blind riveting utilising any reasonable process profile. In other words, the invention may apply rotational and/or axial movements or forces to the blind rivet or self-upsetting blind rivet (or portions thereof). The movements/forces may be of any magnitude, in any combination and following any timing sequence. The apparatus may make use of motor speed and/or acceleration control, for instance it may utilise servo control technology. A further example of a stage in a process profile according to the invention (beyond those outlined above) is a pause in rivet driving where the rivet neither rotates nor moves axially. Such pauses may take place at any time. A pause may be utilised to allow time for external heating to be applied to the workpiece before or after frictional heating, or to allow time for an adhesive situated between workpiece layers to spread. Another stage in a process profile may be an extended axial movement of the rivet (whether rotating or otherwise) after contacting the surface of the workpiece, in order to press two or more layers of the workpiece together before joining them. For instance, the rivet may be advanced onto the top layer of a workpiece without rotating, and may then continue its axial movement to press the top layer into the lower layer(s). The rivet may then rotate and begin its movement into the workpiece.

Although the embodiments described herein refer specifically to blind rivets (self-upsetting or otherwise), it is to be understood that the term 'blind rivet' is intended to include components such as blind rivet nuts or studs which are upset (so as to secure them in an aperture in a workpiece) by axially displacing a mandrel. In the case of a different type of fastener being driven, discussion of the rivet (in relation to it touching the workpiece and the like) should be read as relating to the different type of fastener.

Regardless of the operation in question, the apparatus may utilise the nose of the apparatus to clamp the workpiece. This may produce a more uniform joint area (such as by controlling the distortion and/or separation of the workpiece layers while fastening takes place, and/or by spreading adhesive situated between the layers). Alternatively or in addition, it may assist in the containment of flash produced during the friction stir stage of the riveting operation. Any such clamping may be applied before, after, and/or at any point during the driving and/or upsetting of a blind rivet.

Any recitation of a motor should not be interpreted as being limited to an electric motor but rather should be interpreted as encompassing any form of rotary actuator, such as an electric motor, a hydraulic motor or a pneumatic motor.

Although all of the embodiments described herein depict the rivet being advanced into the workpiece, in other embodiments the rivet may remain axially stationary and the workpiece may be advanced into the rivet.

The described embodiments outline a particular way in which the first transmission can be selectively adjusted (e.g. linear control of degrees of engagement from fully disengaged to fully engaged, as is the case in the third embodiment). However, it should be understood that the way in which the first transmission can be selectively adjusted may take any other suitable form. For example, it may be adjustable only between two degrees of engagement (such as fully disengaged and fully engaged). As another example, it may be adjustable only between a plurality of different degrees of partial engagement. As a further example, one or more of the transmissions may be pre-set to a particular degree of engagement throughout a riveting operation. The above may also apply to the second and third transmissions. The degrees of engagement of any two transmissions may be inversely proportional to one another (as is the case for the first and second transmissions in the third embodiment), may be entirely independent, or may have any other suitable interrelationship.

The methods and/or apparatus according to the invention may be suitable for automated control or monitoring. In particular, the transmission control apparatus may include one or more feedback devices or sensors such as force sensors, torque sensors, electrical current sensors, temperature sensors, (rotary or linear) resolvers or (rotary or linear) positional encoders incorporated within the apparatus. The information from these sensors may be used by a controller such as a computer to monitor the riveting process or collect data for quality assurance or performance monitoring. Alternatively or in addition, the information from such sensors may be used to supply feedback to the controller as to the status or dynamic performance of the apparatus (e.g. the forces and motions currently being applied to the rivet or the temperature of the workpiece). From this feedback the controller can calculate and/or implement real-time adjustments.

In one example of the use of a controller and sensors, data from torque sensors and axial force sensors may be collected for the sake of quality assurance. For instance, an unusually high peak torque or peak axial force experienced by the rivet may indicate that the workpiece material is out of tolerance and is harder than is desired, or may indicate that the rivet is misshapen. Furthermore, positional encoders may feed back to the controller to enable it to detect the axial position of the rivet and calculate the depth of penetration of the rivet. It may then make real-time adjustments as the rivet progresses. For instance, the controller may begin rivet upsetting once it has determined from the axial position information that the head of the rivet has contacted the workpiece surface.

In another example of use of a controller and sensors, the controller may monitor the maximum axial displacement of the rivet in order to detect the production of a faulty joint. In this case, an unusually high maximum displacement may indicate that a rivet has been driven too far into the workpiece, or an unusually low maximum displacement may indicate that the rivet driving process was not successfully completed. Furthermore, the controller may utilise feedback from torque and axial force sensors for real-time process control. For instance, after a rivet has contacted the workpiece and begun to rotate, the controller may signal the robotic arm or separate actuator to drive the rivet into the workpiece after the torque required to rotate it has dropped below a particular value (indicating sufficient workpiece softening).

In a third example of use of a controller and sensors, measurements of axial movement and torque may each be used both for process control and for quality assurance.

When calculating real-time adjustments for process control, or when calculating deviation of a value from the norm for quality assurance, the controller may compare the collected value against an average value, the average value having been calculated by the controller using data it collected from past operations. Alternatively, it may compare the value against a predetermined ideal, maximum or minimum value.

Other arrangements may utilise one or more feedback devices or sensors such as force sensors, torque sensors, temperature sensors, (rotary or linear) resolvers or (rotary or linear) positional encoders or any other suitable component. The information from the sensors may be used for the purposes of process monitoring, quality assurance, process control, statistical data collection, machine diagnostics or for any other suitable purpose.

The apparatus may be configured to provide sufficient heat dissipation from the workpiece or from the brake, clutch or any other component of the apparatus. For instance, the components in need of cooling may be spaced from each other and/or may include fins or apertures to allow sufficient convective and radiant cooling. The apparatus may include active coolant systems such as fans or refrigerant circulation systems instead or in addition. The above cooling features and systems may be used individually or in combination, and multiple components may be cooled utilising common features or systems. Similarly, methods according to the invention may include cooling processes applied to the workpiece, brake, clutch or any other component. Such processes may utilise one or more of the cooling features or systems given above. By way of example, the process may be controlled to keep the maximum temperature of the rivet and workpiece below a certain point so as to avoid damaging a coating (such as a corrosion resistant layer) thereon. One or more temperature sensors may be utilised to monitor the temperature of the workpiece and/or rivet.

In some circumstances, it may be advantageous to arrange the motor in line with the longitudinal axis of the drive shaft and/or distal shaft. For instance, the motor shaft may function directly as the drive shaft, or the motor shaft and the drive shaft may be connected by a planetary gearbox, harmonic drive, clutch, or any other suitable arrangement. The motor being mounted in this way may provide a more compact tool, or one that is easier to mount onto a force reaction frame.

For the avoidance of doubt, it is to be understood that the modifications given above are also applicable to any other aspects of the invention, where appropriate.

The invention claimed is:

1. A friction stir blind riveting apparatus comprising:
a motor, wherein the motor is a driven motor;
a clamp for gripping a mandrel of a blind rivet, the clamp being movable along the axis of the mandrel;
a first transmission configured, when engaged, to transfer rotary motion of the motor to the clamp so as to cause rotary motion of the clamp;
a second transmission configured, when engaged, to convert rotary motion of the motor to linear motion of the clamp, and thereby retract the clamp to pull on the mandrel, when engaged;
a transmission control apparatus arranged to selectively adjust the degree of engagement of at least one of the first and second transmissions, the transmission control apparatus comprising a variable-influence brake or clutch; and
wherein an amount of slip the brake or clutch permits while the motor is being driven can be varied from no slip at all permitted, to slip being completely unrestricted, and anywhere in between.

2. The blind riveting apparatus of claim 1 wherein the transmission control apparatus is arranged to selectively adjust the degree of engagement of both the first and second transmissions.

3. The blind riveting apparatus of claim 2 wherein the second transmission comprises a first threaded member connected to the motor and a second threaded member connected to the clamp, the threads of the first and second threaded members being arranged to directly or indirectly act on each other to convert rotation of the first threaded member relative to the second threaded member into linear motion of the second threaded member.

4. The blind riveting apparatus of claim 3, wherein the transmission control apparatus is configured to engage the first transmission by rotationally coupling the first and second threaded members so as to restrict relative rotation therebetween, and is configured to engage the second transmission by restricting rotation of the second threaded member so that relative rotation of the first and second threaded members takes place.

5. The blind riveting apparatus of claim 2 wherein the transmission control apparatus is arranged to selectively adjust the degree of engagement of said first transmission and/or second transmissions to any degree of engagement within the operable range of the first transmission and/or second transmission.

6. The blind riveting apparatus of claim 2 wherein the transmission control apparatus is arranged to selectively adjust the degree of engagement of said first transmission and/or said second transmission between fully disengaged and fully engaged states.

7. The blind riveting apparatus according to claim 1 wherein the transmission control apparatus comprises a variable-influence brake system.

8. The blind riveting apparatus according to claim 7 wherein the variable-influence brake system comprises a volume of magneto-rheological or electro-rheological fluid retained in a cavity between a rotationally fixed component and a rotational component, the variable-influence brake system further comprising an electric or magnetic field generator arranged to selectively apply an electric or magnetic field to the volume of fluid in order to alter the viscosity of the fluid.

9. The blind riveting apparatus according to claim 7 wherein the transmission control apparatus is configured to selectively adjust the degree of engagement of the second transmission by controlling the amount of slip permitted by the variable-influence brake system.

10. A blind riveting apparatus according to claim 1 further comprising:
a nose tip configured to support the body of said blind rivet; and
a third transmission configured, when engaged, to convert rotary motion of the motor into linear motion of at least the nose tip, wherein the transmission control apparatus is arranged to also selectively adjust the degree of engagement of the third transmission.

11. A blind riveting apparatus according to claim 10, wherein the second transmission is comprised within the third transmission.

12. A blind riveting apparatus according to claim 10 wherein the third transmission comprises a first threaded member connected to the motor and a second threaded member connected to the nose tip, the threads of the first and second threaded members being arranged to directly or indirectly act on each other to convert rotation of the first threaded member relative to the second threaded member into linear motion of the second threaded member.

13. The blind riveting apparatus of claim 1 wherein the apparatus further comprises a nose piece which is configured to engage with the blind rivet, the clamp being arranged to rotate the rivet by rotationally driving the nose piece.

14. The blind riveting apparatus of claim 13 wherein the apparatus further comprises a controller configured to monitor a performance of the apparatus via one or more sensors.

15. The blind riveting apparatus according to claim 1 wherein the transmission control apparatus comprises a one-directional clutch.

16. The blind riveting apparatus of claim 1 wherein the apparatus further comprises a controller configured to gather feedback on a status or dynamic performance of the apparatus via one or more sensors, and calculate and/or implement real-time adjustments to said status or dynamic performance of the apparatus.

17. The blind riveting apparatus according to claim 1, wherein the variable-influence brake or clutch is a mechanical variable-influence brake or clutch.

* * * * *